(12) United States Patent
Alexander et al.

(10) Patent No.: US 10,024,973 B1
(45) Date of Patent: Jul. 17, 2018

(54) GLOBAL NAVIGATION SATELLITE SYSTEM SPOOFER IDENTIFICATION TECHNIQUE

(71) Applicant: Interstate Electronics Corporation, Ahaneim, CA (US)

(72) Inventors: Steven B. Alexander, Orange, CA (US); Gilberto Isaac Sada, Irvine, CA (US)

(73) Assignee: Interstate Electronics Corporation, Anaheim, CA (US)

(*) Notice: Subject to any disclaimer, the term of this patent is extended or adjusted under 35 U.S.C. 154(b) by 540 days.

(21) Appl. No.: 14/678,755

(22) Filed: Apr. 3, 2015

(51) Int. Cl.
*G01S 19/21* (2010.01)
*G01S 19/13* (2010.01)

(52) U.S. Cl.
CPC ............ *G01S 19/215* (2013.01); *G01S 19/21* (2013.01); *G01S 19/13* (2013.01)

(58) Field of Classification Search
CPC ........ G01S 19/215; G01S 19/21; G01S 19/11; G01S 19/03; G01S 19/23; G01S 19/05; G01S 19/13; G01S 3/46; H04B 1/7097
USPC ..................................... 342/357.59
See application file for complete search history.

(56) References Cited

U.S. PATENT DOCUMENTS

| | | | |
|---|---|---|---|
| 5,021,792 A | 6/1991 | Hwang | |
| 5,173,700 A | 12/1992 | Chesley | |
| 5,185,610 A | 2/1993 | Ward et al. | |
| 5,461,387 A | 10/1995 | Weaver | |
| 5,548,293 A | 8/1996 | Cohen | |
| 5,579,021 A | 11/1996 | Lee | |
| 5,617,317 A | 4/1997 | Ignagni | |
| 5,757,316 A | 5/1998 | Buchler | |
| 5,786,791 A | 7/1998 | Bruckert | |
| 5,940,026 A | 8/1999 | Popeck | |
| 5,952,968 A * | 9/1999 | McDowell | ............. G01S 19/21 342/357.59 |
| 5,955,987 A * | 9/1999 | Murphy | ................ G01S 19/215 342/16 |
| 6,018,315 A | 1/2000 | Ince et al. | |
| 6,281,841 B1 | 8/2001 | Nevill | |
| 6,339,396 B1 | 1/2002 | Mayersak | |
| 6,452,543 B1 | 9/2002 | Tseng et al. | |
| 6,466,177 B1 | 10/2002 | Kunysz | |
| 6,580,389 B2 | 6/2003 | Speyer et al. | |
| 6,598,009 B2 | 7/2003 | Yang | |
| 6,700,536 B1 | 3/2004 | Wiegand | |
| 6,952,460 B1 | 10/2005 | Van Wechel et al. | |
| 6,961,017 B1 | 11/2005 | Naylor et al. | |

(Continued)

OTHER PUBLICATIONS

USPTO; Office Action dated Feb. 8, 2017, from related U.S. Appl. No. 14/678,768, filed Apr. 3, 2015.

(Continued)

*Primary Examiner* — Chuong P Nguyen
(74) *Attorney, Agent, or Firm* — Knobbe, Martens, Olson & Bear LLP

(57) ABSTRACT

Disclosed is a technique that can provide one or more countermeasures against spoofers. A direction from which a spoofing attack occurs is identified. A beamformer can control an antenna pattern of a CRPA to null out signals from that direction, which can assist a GNSS receiver to avoid error induced by the spoofing attack. Further, after two or more observations, the location of the spoofer can be identified.

27 Claims, 12 Drawing Sheets

(56) References Cited

U.S. PATENT DOCUMENTS

| | | | | | |
|---|---|---|---|---|---|
| 7,010,262 | B2* | 3/2006 | Tyson | ............... | G01S 5/0036 |
| | | | | | 342/357.27 |
| 7,250,903 | B1* | 7/2007 | McDowell | ............ | G01S 19/215 |
| | | | | | 342/357.59 |
| 7,340,283 | B1 | 3/2008 | Melick et al. | | |
| 7,468,695 | B1 | 12/2008 | Williams | | |
| 7,577,464 | B2 | 8/2009 | Ezal et al. | | |
| 7,764,224 | B1* | 7/2010 | Anderson | ............ | G01S 19/215 |
| | | | | | 342/357.27 |
| 7,952,519 | B1* | 5/2011 | Nielsen | ................ | G01S 19/215 |
| | | | | | 342/357.59 |
| 8,035,562 | B2* | 10/2011 | Chang | ................ | G01S 19/21 |
| | | | | | 342/357.59 |
| 8,044,857 | B2 | 10/2011 | Maenpa et al. | | |
| 8,154,445 | B2 | 4/2012 | Maenpa et al. | | |
| 8,305,265 | B2 | 11/2012 | Ezal et al. | | |
| 8,712,051 | B2* | 4/2014 | Psiaki | ................ | G01S 19/05 |
| | | | | | 380/255 |
| 9,383,449 | B2* | 7/2016 | Kim | ................ | G01S 19/215 |
| 9,523,774 | B2* | 12/2016 | Davies | ................ | G01S 19/215 |
| 9,716,315 | B2* | 7/2017 | Rasheed | ................ | H01Q 3/34 |
| 2002/0169578 | A1 | 11/2002 | Yang | | |
| 2003/0048221 | A1 | 3/2003 | Tseng et al. | | |
| 2005/0228841 | A1 | 10/2005 | Grobert | | |
| 2006/0044204 | A1* | 3/2006 | Kruth | ................ | H01Q 3/2611 |
| | | | | | 343/824 |
| 2007/0293150 | A1 | 12/2007 | Ezal et al. | | |
| 2010/0007555 | A1 | 1/2010 | Ezal et al. | | |
| 2011/0050489 | A1 | 3/2011 | Maenpa et al. | | |
| 2011/0050497 | A1 | 3/2011 | Maenpa et al. | | |
| 2011/0241939 | A1 | 10/2011 | Maenpa et al. | | |
| 2011/0287779 | A1 | 11/2011 | Harper | | |
| 2012/0121087 | A1 | 5/2012 | Psiaki | | |
| 2014/0035783 | A1* | 2/2014 | Contarino | ............... | G01S 19/21 |
| | | | | | 342/357.59 |
| 2014/0247186 | A1* | 9/2014 | Daneshmand | ........ | G01S 19/215 |
| | | | | | 342/357.59 |
| 2015/0116147 | A1 | 4/2015 | Jaeckle | | |
| 2015/0168562 | A1 | 6/2015 | Nichols | | |
| 2015/0234053 | A1 | 8/2015 | Psiaki et al. | | |
| 2015/0268045 | A1 | 9/2015 | Dusha | | |
| 2015/0268350 | A1 | 9/2015 | Whitehead | | |
| 2015/0293234 | A1 | 10/2015 | Snyder et al. | | |
| 2017/0102464 | A1* | 4/2017 | Davies | ................ | G01S 19/215 |

OTHER PUBLICATIONS

Chen, et al.; "Off-the-Shelf Antennas for Controlled-Reception-Pattern Antenna Arrays"; GPS World; Innovation: Getting Control; Feb. 1, 2013, [retrieved on Feb. 26, 2014]. Retrieved from the Internet:<URL: http://gpsworld.com/innovation-getting-control-off-the-shelf-antennas-for-controlled-reception-pattern-antenna-arrays/>.

Wen, et al.; "Countermeasures for GPS Signal Spoofing"; Proceedings of The 18th International Technical Meeting of the Satellite Division of the Institute of Navigation (ION GNSS 2005); Long Beach, CA, Sep. 2005, pp. 1285-1290 , [retrieved on Sep. 24, 2013]. Retrieved from the Internet:<URL: http://lens.ou.edu/Download/ION/ION%202005%20Wen_Spoof.doc>.

USPTO; Office Action dated Sep. 11, 2017, from related U.S. Appl. No. 14/678,768.

* cited by examiner

GLOBAL NAVIGATION SATELLITE SYSTEM SPOOFER IDENTIFICATION TECHNIQUE

CROSS-REFERENCE TO RELATED APPLICATION

This application is related to copending application titled GLOBAL NAVIGATION SATELLITE SYSTEM BEAM BASED ATTITUDE DETERMINATION, Ser. No. 14/678,768, filed on the same date as the present application, the disclosure of which is hereby incorporated by reference in its entirety herein.

BACKGROUND

Field of the Invention

Embodiments of the invention generally relate to electronics, and in particular, to a global navigation satellite system (GNSS) receiver.

Description of the Related Art

The global positioning system (GPS) is an example of a global navigation satellite system (GNSS). A potential threat to the performance of a GNSS receiver is known as "spoofing." Spoofing includes the transmission of false GNSS signals that can trick a GNSS receiver into incorrectly estimating its position, velocity, and/or time. One form of spoofing is known as "meaconing," in which real GNSS signals are rebroadcast in a manner that causes the GNSS receiver to incorrectly estimate position, velocity, and/or time.

It would be desirable to provide a countermeasure to render GNSS receivers less vulnerable to spoofing attacks.

SUMMARY

One embodiment includes an apparatus, wherein the apparatus includes: a beamformer configured to beam steer a main lobe of a controlled reception pattern antenna (CRPA); a processor configured: to cause the beamformer to generate and steer a main lobe of the CRPA to survey a plurality of directions in space; and determine that a spoofer exists along a particular beam angle in the surveyed space when signals appearing to be associated with two or more space vehicles of a global navigation satellite system (GNSS) are higher in signal power along the particular beam angle relative to other directions.

One embodiment includes an electronically-implemented method of invoking a countermeasure for a receiver, wherein the method includes: beam steering a main lobe of a survey antenna pattern of a controlled reception pattern antenna (CRPA) to survey a plurality of directions in space; determining that a spoofer exists along a particular beam angle in the surveyed space when signals appearing to be associated with two or more space vehicles of a global navigation satellite system (GNSS) are higher in signal power along the particular beam angle relative to other directions; and null steering a null of a nulled antenna pattern along the particular beam angle to null out signals emanating from the spoofer.

One embodiment includes an apparatus, wherein the apparatus includes: a beamformer configured to beam steer a main lobe of a first antenna pattern of a controlled reception pattern antenna (CRPA) for surveying and to null steer a null of a second antenna pattern of the CRPA as a countermeasure; and a means for determining that a spoofer exists along a particular beam angle when signals appearing to be associated with two or more space vehicles of a global navigation satellite system (GNSS) increase in signal power along the particular beam angle relative to other directions, wherein the determining means is further configured to cause the beamformer to direct the null along the particular beam angle.

One embodiment includes an apparatus, wherein the apparatus includes: a beamformer configured to generate one or more main lobes of a controlled reception pattern antenna (CRPA), wherein the CRPA is attached, directly or indirectly, to an object; and a processor configured: to associate instances of observed signal strength of signals at various directions with physical locations of a plurality of space vehicles, wherein the plurality of space vehicles comprise sources of the signals; and to determine at least a portion of an attitude of the object based at least partly on the orientation of the object with respect to the physical locations of space vehicles.

One embodiment includes an electronically-implemented method of determining at least a portion of a global attitude of an object, wherein the method includes: surveying at least a portion of space to observe instances of radio frequency (RF) signal strength relative to a line of sight of a main lobe of a controlled reception pattern antenna (CRPA), wherein the main lobe is generated by a beamformer, wherein the CRPA is attached, directly or indirectly, to the object; associating instances of observed signal strength of signals at various directions with physical locations of a plurality of space vehicles, wherein the plurality of space vehicles comprise sources of the signals; and determining the at least portion of the global attitude of the object based at least partly on the orientation of the object with respect to the physical locations of the space vehicles.

One embodiment includes an apparatus for determining at least a portion of a global attitude of an object, wherein the apparatus includes: a beamformer configured to generate one or more main lobes of a controlled reception pattern antenna (CRPA), wherein the CRPA is attached, directly or indirectly, to an object; a means for surveying at least a portion of space to observe instances of radio frequency (RF) signal strength relative to a line of sight of a main lobe of a controlled reception pattern antenna (CRPA), wherein the main lobe is generated by a beamformer; and a means for associating instances of observed signal strength of signals at various directions with physical locations of a plurality of space vehicles, wherein the plurality of space vehicles comprise sources of the signals; and a means for determining the at least portion of the global attitude of the object based at least partly on the orientation of the object with respect to the physical locations of the space vehicles.

BRIEF DESCRIPTION OF THE DRAWINGS

These drawings (not to scale) and the associated description herein are provided to illustrate specific embodiments of the invention and are not intended to be limiting.

DETAILED DESCRIPTION OF SPECIFIC EMBODIMENTS

Figure 1:
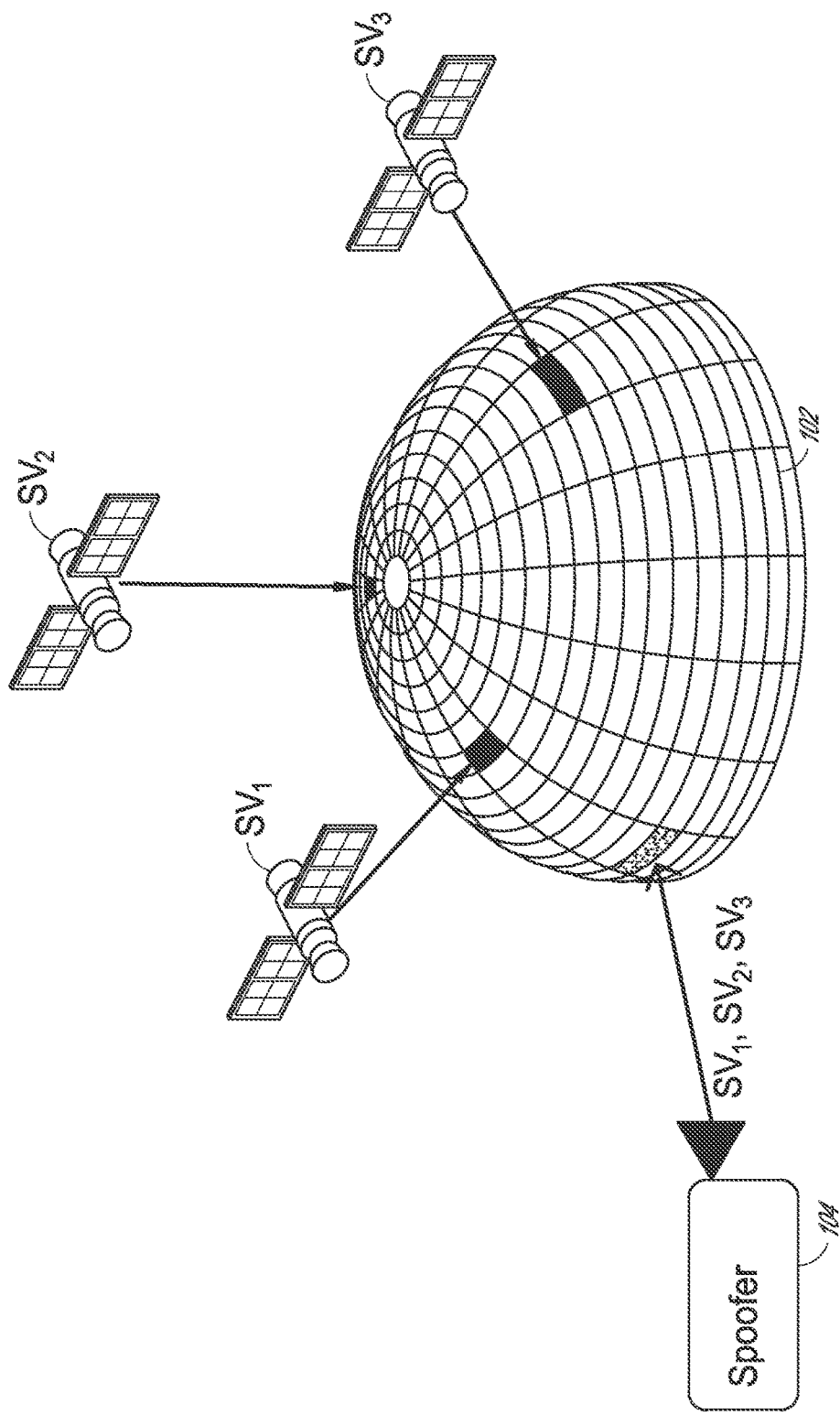
FIG. 1 illustrates a 3-dimensional representation of space showing a spoofer, space vehicles, and a 3-d semi-hemispherical grid representing azimuth and elevation angles of a controlled reception pattern antenna (CRPA).

Although particular embodiments are described herein, other embodiments of the invention, including embodiments that do not provide all of the benefits and features set forth herein, will be apparent to those of ordinary skill in the art.

Accurate reporting of position, velocity, and time are indeed desirable attributes of any GNSS receiver. While illustrated in the context of the NAVSTAR Global Positioning System (GPS), the principles and advantages described herein are applicable to other GNSS, such as, but not limited to, the Russian GLONASS system, the European Galileo system, the Chinese COMPASS system, the Indian IRNSS system, or the like.

GNSS receivers include, but are not limited to, navigation systems, surveying and mapping equipment, flight data recorders and other vehicle tracking equipment, Aircraft Communications Addressing and Reporting System (AC-ARS), and the like. Various types of objects can rely on the GNSS-based information. These objects can include, but are not limited to smart phones, cars, trucks, aircraft, gliders, helicopters, watercraft, driverless or autonomous motor vehicles, unmanned aerial vehicles (UAVs), guided missiles, cruise missiles, smart bombs, artillery, robots, farm equipment, network equipment, decoys, transponders, and the like. If a GNSS receiver for these objects were to incorrectly report information, undesirable events can occur to the object relying on the GNSS-based information, such as getting lost or thrown off course, incorrectly fertilizing a field, getting into accidents or crashes, incorrectly reporting position, velocity, and/or time in log entries, incorrectly synchronizing transmission of data, incorrectly mapping a region, or the like.

One embodiment of the invention can advantageously provide one or more countermeasures against spoofers. One embodiment identifies a direction from which a spoofing attack occurs. A beamformer can control an antenna pattern of a controlled reception pattern antenna (CRPA) to generate a variety of antenna patterns, such as directional patterns with a main lobe and/or to generate one or more nulls for a pattern that may or may not be directional. For example, a variety of different antenna patterns can be selected for beam steering or for null steering. These different antenna patterns can vary by, for example, applying different phase shifts for the signals from the elements of the CRPA. Parameters for antenna patterns, such as phase shift information, can be generated during a calibration operation and can be stored in lookup tables for access during operation and can also be generated during use using space-time adaptive processing (STAP) and/or space-frequency adaptive processing (SFAP).

With digital beamforming, many different antenna patterns can be generated at the same time. The different antenna patterns are generated via different patterns of constructive and destructive interference. When a directional antenna pattern is generated by the beamformer, the antenna pattern exhibits gain along the direction of the main lobe. A beam can be steered by changing the antenna pattern to one that has the main lobe along a different direction. When a null is generated by the beamformer, the antenna pattern exhibits attenuation or loss along the direction of the null. The nulls can also be steered by changing the antenna pattern from among various antenna patterns having nulls. Beams with relatively narrow lobes can be used to identify and track a spoofer, and the beamformer can simultaneously direct a null along the direction from which the spoofing attack occurs, which can assist a GNSS receiver to avoid error induced by the spoofing attack. Further, after two or more observations, the location of the spoofer can be identified.

One embodiment of the invention can advantageously estimate at least a heading or attitude, such as an azimuth angle from true North, based on beam angles from a controlled reception pattern antenna (CRPA) to space vehicle locations. Other attitude information such as roll and/or pitch can additionally be estimated. The heading or attitude can be provided with or without an additional sensor, such as a compass or magnetometer, an inertial measurement unit (IMU), or the like. A heading or attitude estimate can be useful because oftentimes the heading or attitude of an object can vary from its track or velocity direction as will be illustrated later in connection with FIG. 8 and FIGS. 11A-11C.

FIG. 1 (not to scale) illustrates a 3-dimensional representation of space showing a spoofer, space vehicles $SV_1$, $SV_2$, $SV_3$, and a 3-d grid 102 having grid cells illustrating reference angles for a controlled reception pattern antenna (CRPA) of a GNSS receiver. The 3-d grid 102 represents discrete directions to which a main lobe or even a null of the CRPA can be steered. The CRPA is located at the origin of the hemisphere of the 3-d grid 102. The density of the grid is only shown for example, and there can be greater or fewer cells than those shown.

For clarity, three space vehicles $SV_1$, $SV_2$, $SV_3$ and a spoofer 104 are shown. Of course, there can be additional space vehicles in view and more than one spoofer. GNSS receivers typically calculate line of sight (LOS) "vectors" as a matter of course, and it can be efficient to reuse the calculations rather than to calculate new LOS vectors. In certain embodiments, the LOS vectors from the GNSS receiver to each of the space vehicles $SV_1$, $SV_2$, $SV_3$ can be calculated without regard to ionospheric effects. In other embodiments, the LOS vectors can take refraction in the ionosphere into consideration. Consideration of refraction is optional for the techniques disclosed herein. The remainder of this disclosure will describe the attitude determination technique without consideration of refraction.

When a main lobe or "beam" of the CRPA is pointed to the space vehicle, such as space vehicle $SV_1$, an indicator of signal power increases for the space vehicle $SV_1$, but should not increase for the other space vehicles $SV_2$, $SV_3$. By contrast, when the main lobe of the CRPA is pointed to the spoofer 104, the indicator of signal power should increase for multiple space vehicles. The signals increase in power because the spoofer 104 typically broadcasts or rebroadcasts false signals for multiple space vehicles. In one embodiment, multiple means any number greater than two. However, other numbers can be used. For example, sensing that signals from at least 3, 4, 5, 6, 7, 8, 9, 10, 11, 12, 13, 14, 15, or 16 space vehicles have increased in signal power is used to identify that the spoofer 104 exists along the direction of the main lobe. In some embodiments, sensing that signals from a majority of the space vehicles in view have increased in signal power is used to identify that the spoofer 104 exist the direction of the main lobe. By "in view," what is meant is that signals apparently from the space vehicle have been acquired and are being tracked. Of course, a GNSS receiver can erroneously track a false signal from the spoofer 104 and treat the false signal as originating from a real space vehicle.

Any indication of signal power can be used. For example, the indication of signal power can be a carrier power to noise density ratio (C/No). In other examples, the indication of signal power can be signal to noise ratio, signal to interference plus noise ratio, carrier power to noise ratio, carrier power to interference plus noise ratio, raw power or the like. Certain GNSS receivers may estimate an indication of signal power for each SV satellite signal that they are tracking for other purposes, and it can be economical to reuse the same indication of signal power for the disclosed spoofer identification technique. Of course, a different indication of signal power can be used.

In an alternative embodiment, instead of steering a main lobe or beam of the CRPA, an antenna pattern with a null is steered to search for spoofers. When a null is pointed to a space vehicle, such as space vehicle $SV_1$, an indicator of signal power should decrease for the space vehicle $SV_1$, but should not decrease for the other space vehicles $SV_2$, $SV_3$. By contrast, when the null of the CRPA is pointed to the spoofer 104, the indicator of signal power should decrease for multiple space vehicles.

Figure 2:
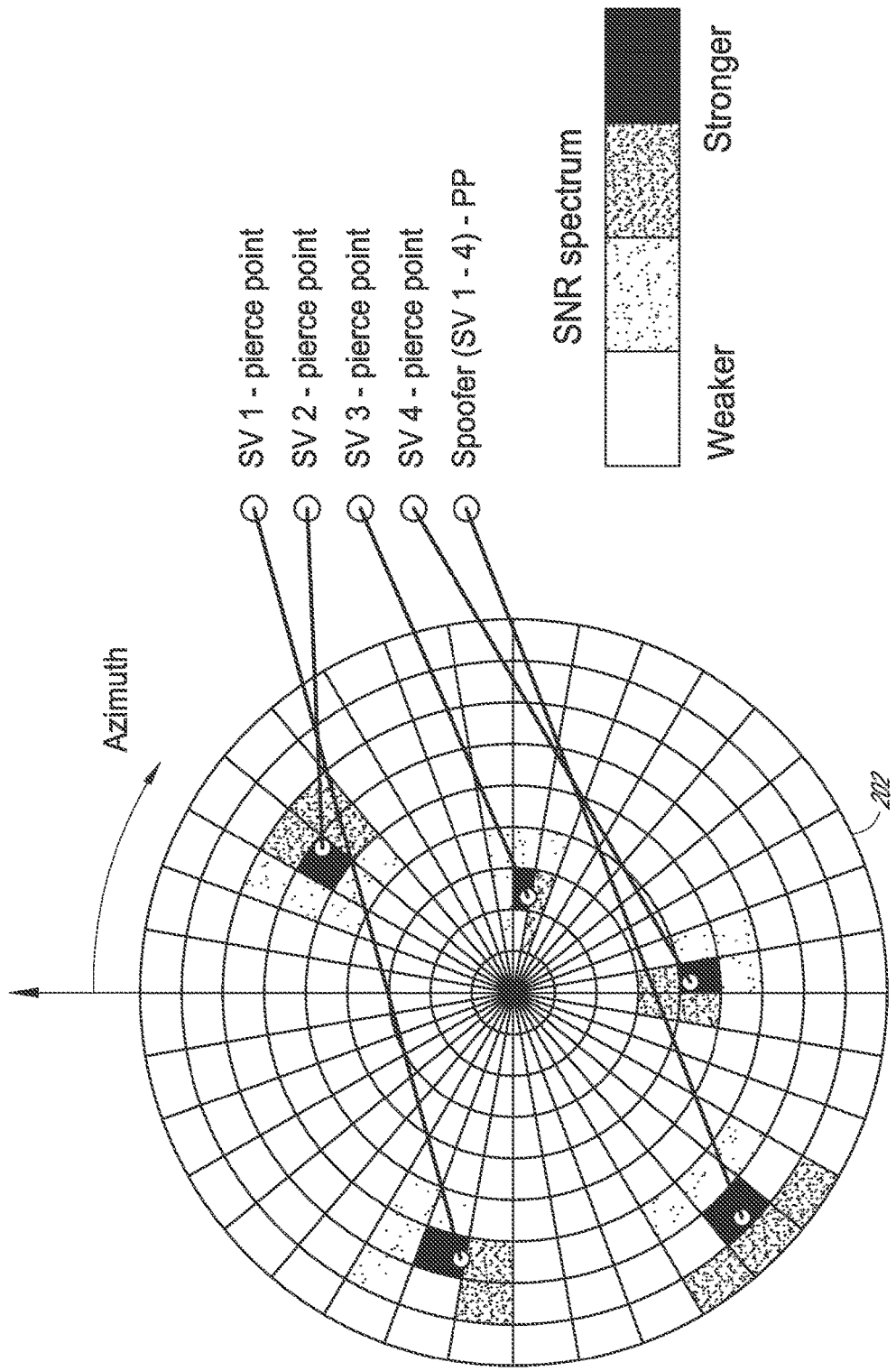
FIG. 2 illustrates a 2-dimensional "top down" representation of signal-to-noise ratio (SNR) observed by the CRPA/GNSS receiver with respect to azimuth and elevation angles.

FIG. 2 illustrates a 2-dimensional "top down" grid 202 representation of signal-to-noise ratio (SNR) observed by the CRPA/GNSS receiver with respect to azimuth and elevation angles. At least one reference frame is used. Two reference frames can optionally be used. A first reference frame is sensitive to the relative orientation of the CRPA/GNSS receiver. For example, when a CRPA/GNSS receiver is used in an object such as an airplane that can move, change direction, roll, pitch, etc., the angles from the CRPA/GNSS receiver to the space vehicles or other signal sources. A second reference frame can be independent of orientation, such as, calculated based on a reference orientation, such as an orientation corresponding to level flight and a North heading. Information from one reference frame to another can be converted using coordinate transformations.

The 2-d grid 202 can indicate azimuth angle around the circumference from an arbitrary reference point for an orientation-dependent reference frame, such as straight ahead for an air vehicle, or from a fixed reference for an orientation-independent reference frame, such as North. Other angle directions and reference points can alternatively be used. The 2-d grid 202 indicates an elevation angle with radius. For example, the outermost cells of the 2-d grid 202 can correspond to directions with relatively low angles and the innermost cells of the 2-d grid 202 can correspond to directions with relatively high angles. For example, a cell with zero or near radius at the origin can be considered to be directly above or below (local reference frame) or towards the center of the Earth or away from the center of the Earth (global reference frame). A cell with a relatively large radius can be considered to be more to the sides (local reference frame) or to the horizontal (global reference frame).

As illustrated in FIG. 2, the relative signal strength increases a signal from a particular space vehicle of the plurality of space vehicles SV1-SV4 when the main lobe of the CRPA is directed at the particular space vehicle, but signals from the other space vehicles should not increase in strength. Also, in the illustrated example, the relative signal strength increases for the signals from all the individual space vehicles SV1-SV4 when the main lobe of the CRPA is directed at the spoofer. However, it will be appreciated that the number of signals that will increase in power when the main lobe is directed at the spoofer will vary based on the number of signals transmitted by the spoofer.

Figure 3:
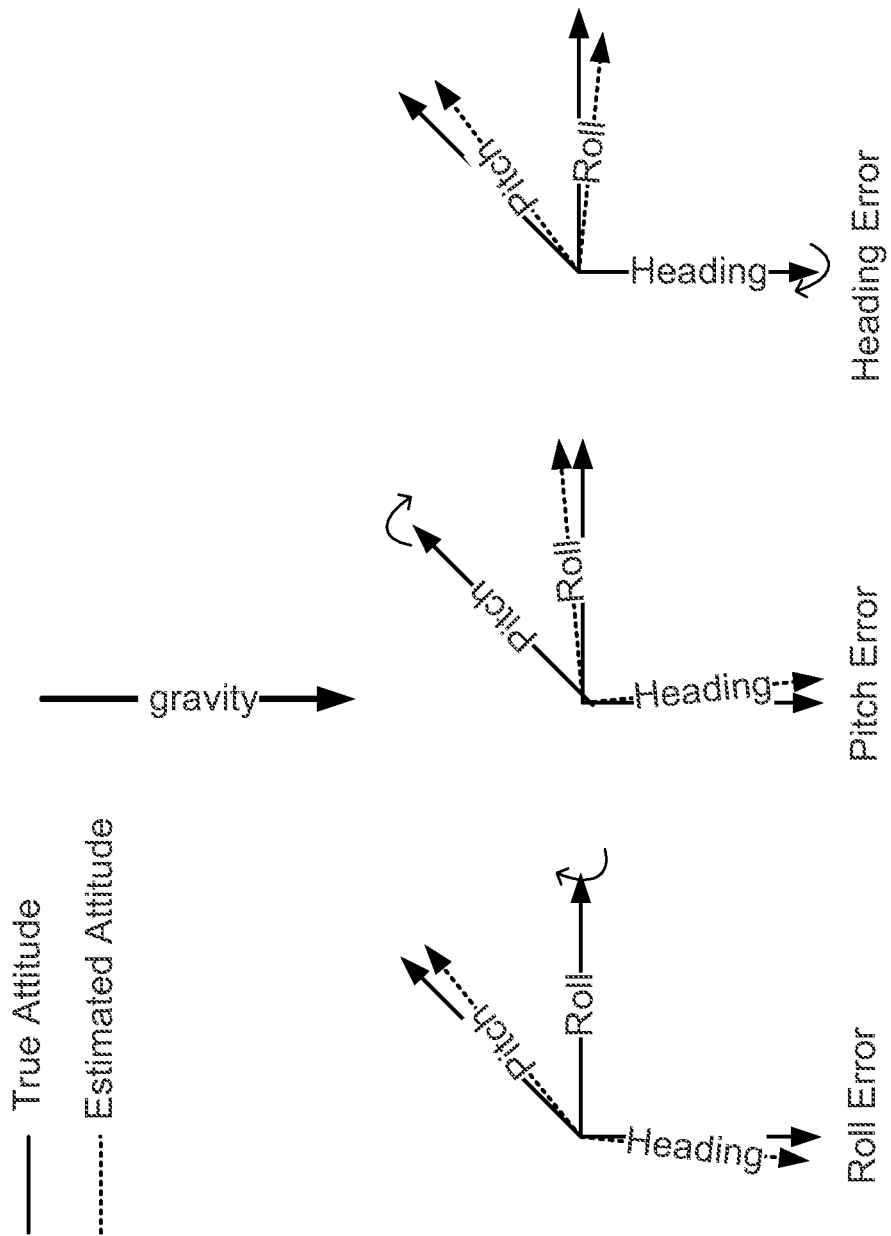
FIGS. 3A, 3B, and 3C separately illustrate a roll error, a pitch error, and a heading error, respectively.

FIGS. 3A, 3B, and 3C individually illustrate a roll error, a pitch error, and a heading error, respectively. These errors illustrate accumulated gyroscope drift. In each of FIGS. 3A, 3B, and 3C, gravity points downwards. Ideally, when steady and level, an accelerometer for the heading axis is aligned with gravity (straight to the center of the Earth), and accelerometers for the roll axis and the pitch axis do not sense gravity as each is orthogonal to the heading axis. The vehicle's true attitude (roll, pitch, and heading) is indicated by solid lines. The vehicle's estimated attitude is indicated by dashed lines. Each error is illustrated separately for clarity, but the errors can appear in combination.

FIG. 3A illustrates the effects of drift along the roll axis. Actual rotation about the roll axis can be confirmed by accelerometer measurements on the pitch axis and the heading axis. The roll axes for both the true and estimated attitude are aligned in the example. After a period of time, the gyroscope roll drift accumulates to a roll error as illustrated in FIG. 3A. This drift causes the heading axis and the pitch axis of the true attitude and estimated attitude to shift apart, which results in an inconsistency. This inconsistency is readily observable by the accelerometers used to sense acceleration along the heading axis or the pitch axis because of gravity. For example, if there is no actual change in pitch, the force of gravity sensed by the accelerometers for the heading axis and the pitch axis should stay the same. However, if there is a change in pitch, then the force of gravity measured by the accelerometers for pitch and for heading should also change. Thus, for example, if there is no actual change in pitch, but due to drift, the gyroscope indicates a change, then an inconsistency arises between the gyroscope measurements and the accelerometer measurements. This inconsistency can be used to calibrate both gyroscopes and the accelerometers.

FIG. 3B illustrates the effects of drift along the pitch axis. Actual rotation about the pitch axis can be confirmed by accelerometer measurements on the roll axis and the heading axis. The pitch axes for both the true and estimated attitude are aligned in the example. After a period of time, the drift accumulates to a pitch error as illustrated in FIG. 3B. This drift causes the heading axis and the roll axis of the true and estimated attitude to drift apart, and the presence of the drift can similarly be detected by an inconsistency with gravity readings of the accelerometers of the heading axis and the roll axis. Thus, drift due to pitch error is also readily compensated.

However, FIG. 3C illustrates that a heading error is difficult to observe. Actual rotation about the heading axis cannot be confirmed with accelerometer measurements. The heading axes for both the true and estimated attitude are aligned in the example. After a period of time, the drift accumulates to a heading error as illustrated in FIG. 3C. However, while the heading error causes the pitch axis and the roll axis of the true and estimated attitude to drift apart, they typically remain orthogonal to gravity and the presence or absence of a heading error is not readily observable by accelerometers in the pitch axis or roll axis, and is thus difficult to compensate. Thus, in conventional systems, drift in the gyroscope(s) used for the heading axis typically goes uncompensated.

Figure 4:
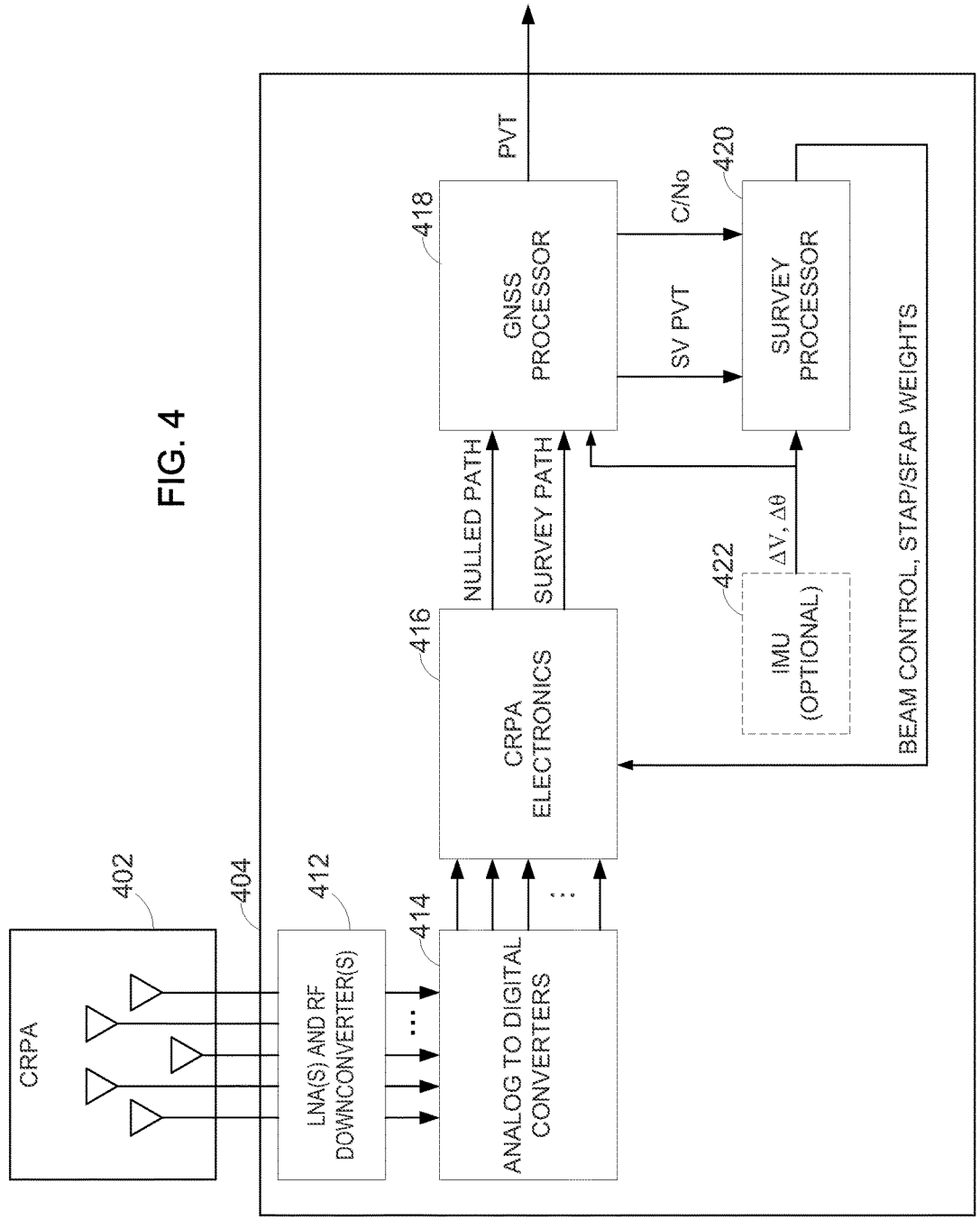
FIG. 4 illustrates an embodiment of a CRPA and a global positioning system (GPS) receiver.

FIG. 4 illustrates an example of a CRPA 402 and a GNSS receiver 404. The CRPA 402 has multiple elements or multiple sub-groups of elements. As used herein, the term element will encompass sub-groups of elements that are processed together. The number of elements that the CRPA 402 has can vary in a very broad range. The number of main lobes and nulls that can be generated will vary based on the number of elements so that generally, greater numbers of elements are better for performance. However, each additional antenna element adds to the size and cost of the CRPA 402, and to the size, cost, and power consumption of the GNSS receiver 404 as well, so the precise number of antenna elements is usually subject to an engineering tradeoff Examples of numbers for the number of elements include, but are not limited to, 3, 4, 5, 6, and 7. However, other suitable numbers of elements will be readily determined by one of ordinary skill in the art. Commercial, off the shelf, CRPAs are available and can be used.

The GNSS receiver 404 can be a global positioning system (GPS) receiver. The illustrated GNSS receiver 404 includes low noise amplifiers (LNAs) and radio frequency (RF) downconverters 412, analog to digital converters (ADCs) 414, CRPA electronics 416, a GNSS processor 418, a survey processor 420, and an optional inertial measurement unit (IMU) 422. Various components of the GNSS receiver 404 can be implemented by hardware, by software/firmware executed by a processor, or by a combination of both hardware and software/firmware. RF signals from each antenna element of the CRPA 402 are amplified and downconverted by the LNAs and downconverters 412 to generate intermediate frequency (IF) signals. Portions of the GNSS processor 418 and the survey processor 420 can be efficiently implemented in software/firmware, and can even be implemented using the same or different processors for execution of instructions. The IF signals are then converted to digital form by the ADCs 414 to generate digital IF signals. In the context of military GPS receivers utilizing both L1 and L2 bands, a digital IF signal downconverted from L1 and a digital IF signal downconverted from L2 can be generated for each antenna element. An advantage of using digital IF signals is that multiple independent beams and multiple independent nulls can be formed from the signals of the CRPA 402.

To generate a main lobe or a null, the beamformers of the CRPA electronics 416 can apply complex weights (amplitude and phase shift) to the digital IF signals from each element, and the weighted signals are summed together. The values for the complex weights depend on, for example, the RF frequency, the desired direction for the main lobe or the null, the widths of the main lobe or the null, and the spacing of the CRPA. Via constructive and destructive interference, an antenna pattern is generated. To steer the main lobe or the null, different complex weights are applied. The appropriate complex weights to use can be determined during a manufacturing, testing, and/or calibration process or during a design phase, and appropriate values can be stored in a lookup table such that the complex weights can be predetermined. The beamformers of the CRPA electronics 416 can optionally be used in conjunction with space-time adaptive processing (STAP), space-frequency adaptive processing (SFAP) or other techniques to modify predetermined beamforming complex weights. Examples of STAP processing and beamforming in the context of GPS are described in U.S. Pat. No. 6,952,460 to Van Wechel, et al., the disclosure of which is hereby incorporated by reference herein in its entirety.

In the illustrated embodiment, the CRPA electronics 416 generate two outputs. A first output provides a nulled path, and a second output provides a survey path. Additional paths can be generated. For example in the context of GPS, there can be a nulled path generated for the downconverted L1 signals and a nulled path generated for the downconverted L2 signals. In addition, with digital beamforming, multiple survey paths can be generated and searched in parallel if desired.

Signals from the separate antenna patterns of the nulled path and the survey path are provided as inputs to the GNSS processor 418. The nulled path corresponds to an antenna pattern with one or more spoofers nulled when one or more spoofers have been detected, for example, a relatively omnidirectional antenna pattern with one or more steered nulls. If no spoofers are detected, the nulled path can have a normal antenna pattern, such as an omnidirectional antenna pattern. The survey path is a path that is used for searching for one or more spoofers. In the context of GPS, the GNSS processor 418 acquires and tracks the direct-sequence spread spectrum (DSSS) signals from the various satellites and/or spoofers.

The GNSS processor 418 generates a position, velocity, and time (PVT) output relating to the object's position, velocity, and time as observed using signals received via the nulled path. The GNSS processor 418 also generates SV PVT for the space vehicles and an indication of signal power, such as carrier power to noise density ratio (C/No) from the signals received via the survey path for the survey processor 420. One embodiment of the GNSS processor 418 will be described in greater detail later in connection with FIG. 5.

The survey processor 420 receives the PVT and indication of signal power for the various space vehicles from the GNSS processor 418 and can optionally receive acceleration $\Delta V$ and angular velocity $\Delta \theta$ information from the optional IMU 422. The survey processor 420 controls the survey lobe(s) and keeps track of the null(s) generated by the CRPA electronics 416 and can also calculate coefficients for STAP or SFAP. The optional IMU 422 can be useful to keep track of directions to space vehicles and/or to spoofers in the presence of motion, such as the maneuvering of a UAV or other object carrying or incorporating the CRPA/GNSS receiver. The survey processor 420 can be implemented by a processor executing program instructions for software/firmware stored in a non-transitory computer-readable medium. For example, an embeddable ARM processor can be used. Alternatively, electronic hardware, such as an application specific integrated circuit or a field programmable gate array implementing logic circuits, state machines, and the like, can be used to implement the survey processor 420.

Figure 5:
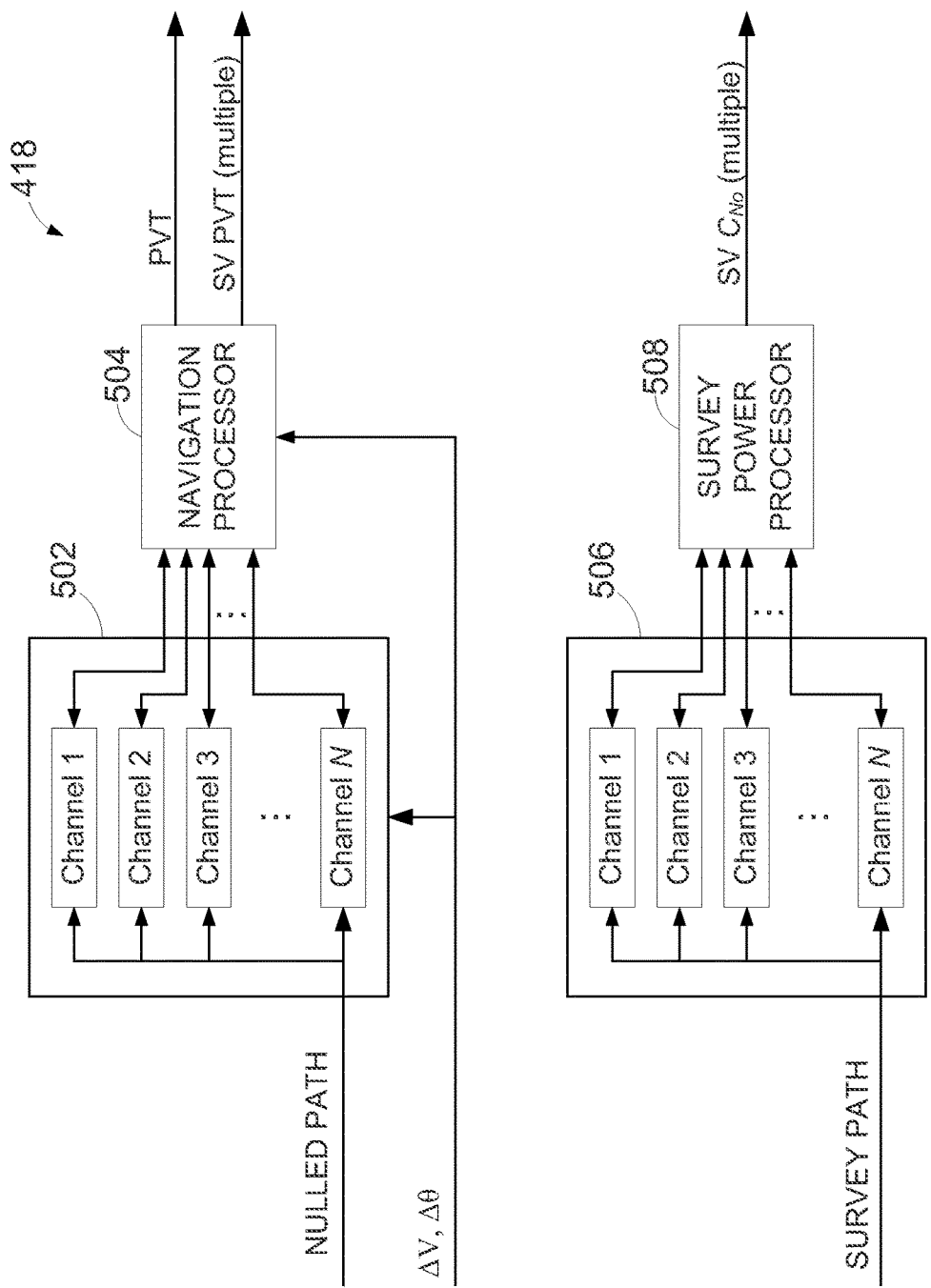
FIG. 5 illustrates one embodiment of a GNSS processor.

FIG. 5 illustrates one embodiment of the GNSS processor 418. The GNSS processor 418 includes a first digital signal processor 502, a navigation processor 504, a second digital signal processor 506, and a survey power processor 508. The first digital signal processor 502 and the navigation processor 504 can be similar to conventional GNSS configurations for acquiring and tracking the signals from the SVs and determining PVT, respectively, except that the signals provided to the first digital signal processor 502 are from the nulled path such that interfering signals from one or more spoofers are vastly suppressed. For example, the first digital signal processor 502 includes a plurality of processing channels for acquiring and tracking signals from space vehicles. The first digital signal processor 502 can include code matched filters or correlators and code and carrier tracking loops for acquiring and tracking the DSSS signals from the space vehicles. The first digital signal processor 502 can provide timing information, such as pseudorange and deltarange, and demodulated navigation messages as outputs. An example of a fast acquisition correlator is described in U.S. Pat. No. 6,466,958 to Van Wechel, et al., the disclosure of which is hereby incorporated by reference herein, however, other types of correlators, including serial correlators, can be used. Optionally, the first digital signal processor 502 can receive the acceleration ΔV and angular velocity Δθ information from the optional IMU 422 for rate aiding of the tracking loops.

The navigation processor 504 receives the timing information and navigation messages from the first digital signal processor 502. A navigation message of a space vehicle includes ephemeris information, which is used to determine a precise position and velocity of the space vehicle at a particular time. The ephemeris information can alternatively or additionally be preloaded before, for example, an object's flight or received from a different data source, such as from a wireless network. The navigation processor 504 also determines positions of the space vehicles, extrapolates future positions of the space vehicles, and can extrapolate azimuth and elevation points upon object motion, and can use the IMU data for providing an attitude or portion thereof. An alternative technique for generating an attitude will be described later in connection with FIGS. 8-12 with reference to FIGS. 3A-3C.

The second digital signal processor 506 can be similar to conventional GNSS configurations for acquiring and tracking the signals from the SVs and can be a different design or the same design as the first digital signal processor 502. However, unlike the first digital signal processor 502, which receives signals from the nulled path, the second digital signal processor 506 receives signals from the survey path. The survey path is controlled to search for spoofers. To expedite the search for spoofers, it can be advantageous to use a fast acquisition correlator, such as the fast acquisition correlator described in U.S. Pat. No. 6,466,958 to Van Wechel, et al. However, other types of correlators, including serial correlators, can be used. In addition, the number of channels N of the second digital signal processor 506 can be the same or different than the number of channels N of the first digital signal processor 502.

The survey power processor 508 includes a plurality of processing channels for acquiring and tracking signals, whether genuine or spoofed, that appear to be from space vehicles. The survey power processor 508 does not need all the features of the navigation processor 504. Typically, the survey path will utilize an antenna pattern with a relatively narrow beam or main lobe of a survey pattern to search space for spoofers. The survey pattern exhibits gain along the direction of the main lobe. By adjusting the survey pattern, the main lobe can be effectively steered. By acquiring and tracking a DSSS signal, an indication of signal power, such as carrier power to noise density ratio (C/No) can be assessed. Conventional techniques for determining the indication of signal power, such as carrier power to noise density ratio (C/No) can be used. The indication of signal power is used by the survey processor 420 (FIG. 4) to determine where one or more spoofers exist and to generate an antenna pattern with one or more nulls in the direction of the spoofer to provide a countermeasure against the spoofer. Additional digital signal processors, navigation processors, and survey power processors can be included in the GNSS processor 418 for tracking of other GNSS signals, such as the P(Y) signal of GPS.

Figure 6:
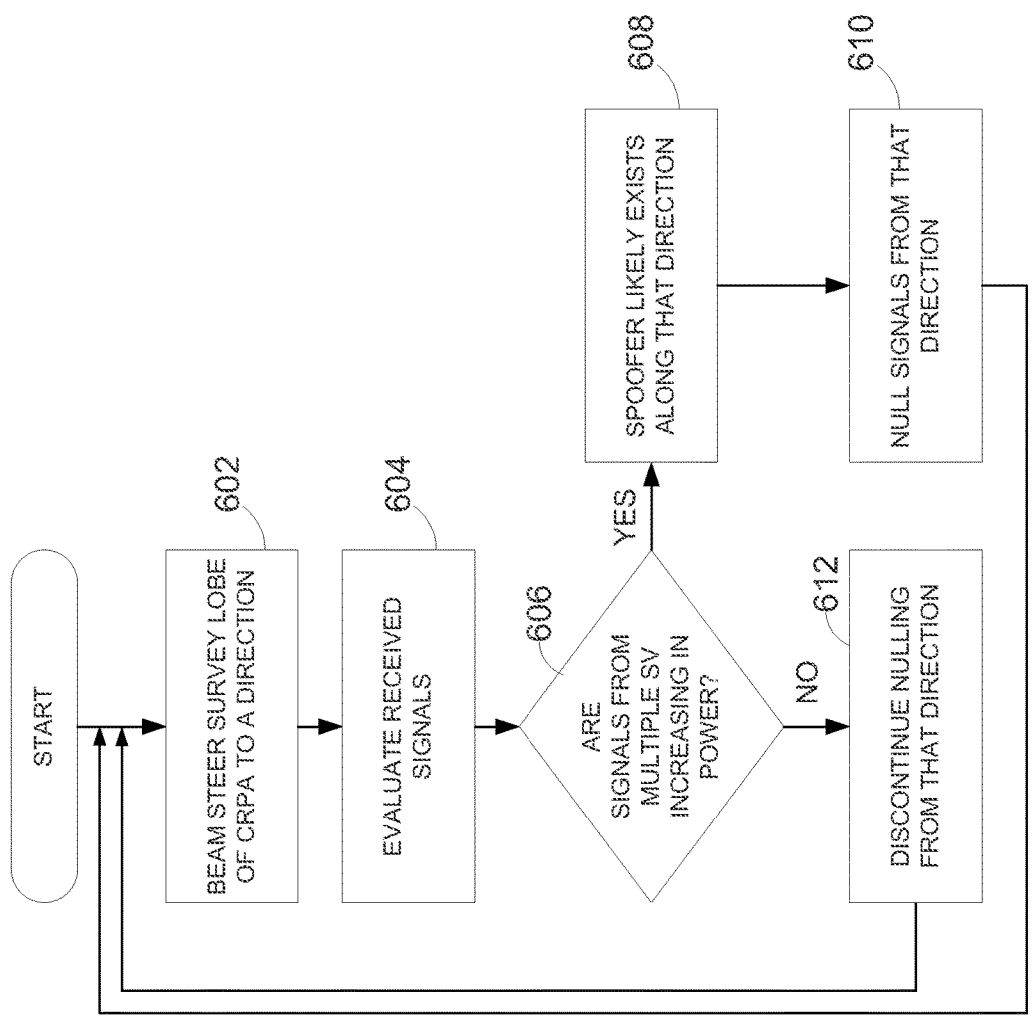
FIG. 6 illustrates an example of a process to detect and locate a spoofer with respect to a local reference frame.

FIG. 6 illustrates an example of a process to detect and locate one or more spoofers with respect to a local reference frame. It will be appreciated by the skilled practitioner that the illustrated process can be modified in a variety of ways. For example, in another embodiment, various portions of the illustrated process can be combined, can be rearranged in an alternate sequence, can be removed, or the like. The process can be performed by the GNSS receiver 404 (FIG. 4). After a spoofer is located, the antenna pattern of the CRPA can be adjusted or beamformed to form a null in the direction of the spoofer as a countermeasure against spoofing. The antenna pattern can be dynamically changed over time to account for movement of an object carrying the CRPA/GNSS receiver, movement of a spoofer, appearance of new spoofers, and/or disappearance of previously-observed spoofers. In one embodiment, the GNSS receiver 404 can stop tracking or stop relying on the signals that correspond to the spoofed signals for generating position solutions. Each space vehicle in the GPS system transmits coarse/acquisition C/A code and precise (P(Y)) code signals with unique codes (unique at least within the field of view). A military (M) code signal may also be transmitted. The GNSS receiver 404 acquires and tracks at least one of these signals from a space vehicle. In other systems, each space vehicle can use a unique frequency (unique at least within the field of view). By forming a null in the antenna pattern along the direction to the spoofer and maintaining the null, the GNSS receiver 404 can ignore the spoofed signals from the spoofer and generate position solutions based on authentic signals.

The process begins in a state 602, in which the main lobe of a survey antenna pattern, that is, a "survey lobe," or "spot beam" is beam steered to a particular direction. For example, the survey processor 420 (FIG. 4) can instruct the beamformers of the CRPA electronics 416 to generate an appropriate antenna pattern for the particular direction for the survey path. For example, the survey processor 420 can provide the beamformers of the CRPA electronics 416 with weights and phase shifts to apply to form the survey path. In alternative embodiments, the survey processor 420 can provide the beamformers of the CRPA electronics 416 with azimuth and elevation angles or each cell of an antenna pattern can be given an address, and the address can be communicated, or the like. The process advances from the state 602 to a state 604.

In the state 604, the signals received along the survey path are evaluated for the possible existence of a spoofer. Indications of power, such as carrier power to noise density (C/No) for multiple satellites, can be determined by the second digital signal processor 506 and the survey power processor 508. The process advances from the state 604 to a decision block 606.

In the decision block 606, the process determines whether or not signals associated with multiple different space vehicles increase in power along a particular direction relative to previous power measurements in which the beam was not pointing along the particular direction. For example, for the decision block 606, the signals associated with multiple space vehicles can be observed to increase by a predetermined amount of power or an adaptively variable amount of power, or alternatively for the decision block 606, the signals associated with multiple space vehicles can be observed to be stronger than a particular threshold, which can be predetermined or adaptively variable. When a spoofer is present, the spoofer can broadcast signals corresponding to relatively many, if not all, the space vehicles in view in the area. To deceive a GNSS receiver, a spoofer will typically have to spoof signals from at least 4 space vehicles. In one embodiment, multiple means any number greater than 2. Ordinarily, signals from none or only one space vehicle should increase in power along a particular direction. Due to the presence of sidelobes, multipath, appearance/disappearance of obstacles due to movement of the obstacles, SVs, and/or the object, and the like, it is possible for signals of more than one space vehicle to increase in power along a particular direction without a spoofer being present, and numbers greater than 2 can alternatively be used. Other examples of numbers that can be used for "multiple" include at least 3, 4, 5, 6, 7, 8, 9, 10, 11, 12, 13, 14, 15, or 16. In some embodiments, the process determines that signals from a majority of the space vehicles in view have increased in signal power for the decision block 606.

It should be noted that each space vehicle transmits signals that are uniquely associated with the space vehicle. For example, each space vehicle within GPS is assigned a unique spreading code. Within GLONASS, each space vehicle that can be viewed in a particular spot is assigned a unique frequency (frequencies of antipodal space vehicles are reused). However, a spoofer may falsely transmit a signal with the unique spreading code (GPS) or frequency (GLONASS) assigned to a space vehicle in an attempt to generate a signal that is mistaken for a genuine signal. Nonetheless, both genuine signals and false signals generated by a spoofer will be associated with space vehicles.

When the process determines that signals associated with multiple space vehicles are increasing in power relative to previous beam angles, the process proceeds from the decision block 606 to a state 608. Otherwise, the process proceeds from the decision block 606 to the state 612.

In the state 608, the process can determine that a spoofer is likely to exist along that direction, that is, the particular direction or beam angle can be a bearing to a spoofer. The process can optionally perform repeated observations along that direction to confirm the existence of the spoofer. The process advances from the state 608 to a state 610.

In the state 610, the process attenuates signals that emanate along the direction to the spoofer by adjusting the antenna pattern generated by the beamformers of the CRPA electronics 416. This null-based countermeasure can be used on a standalone basis or can be combined with other countermeasures including techniques already known and those yet to be developed. For example, the survey processor 420 can provide the beamformers of the CRPA electronics 416 with weights and phases to apply for beamforming along the nulled path or with one or more directions to form a null for the nulled path. It should be noted that both the beam steering described in the state 602 and the null steering of the state 610 should be actively steered to compensate for changes in attitude induced by vehicle dynamics. Information from an IMU can assist such beam steering and the null steering. The process can return from the state 610 to the state 602 to continue to survey space.

In the state 612, the process can optionally discontinue generating a null for the nulled path along a previously identified direction to a spoofer. For example, the object carrying or incorporating the CRPA/GNSS receiver can correspond to an air vehicle, and the object can move away from the range of the spoofer, the spoofer can be deactivated, the spoofer can be destroyed, etc. The process returns from the state 612 to the state 602 to continue to survey space.

In an alternative embodiment, the process can steer a null to search for a spoofer instead of steering the main lobe. When a null is pointed to a space vehicle, such as space vehicle SV1, an indicator of signal power should decrease for the space vehicle SV1, but should not decrease for the other space vehicles SV2, SV3. By contrast, when the null of the CRPA is pointed to the spoofer 104, the indicator of signal power should decrease for multiple space vehicles.

Figure 7:
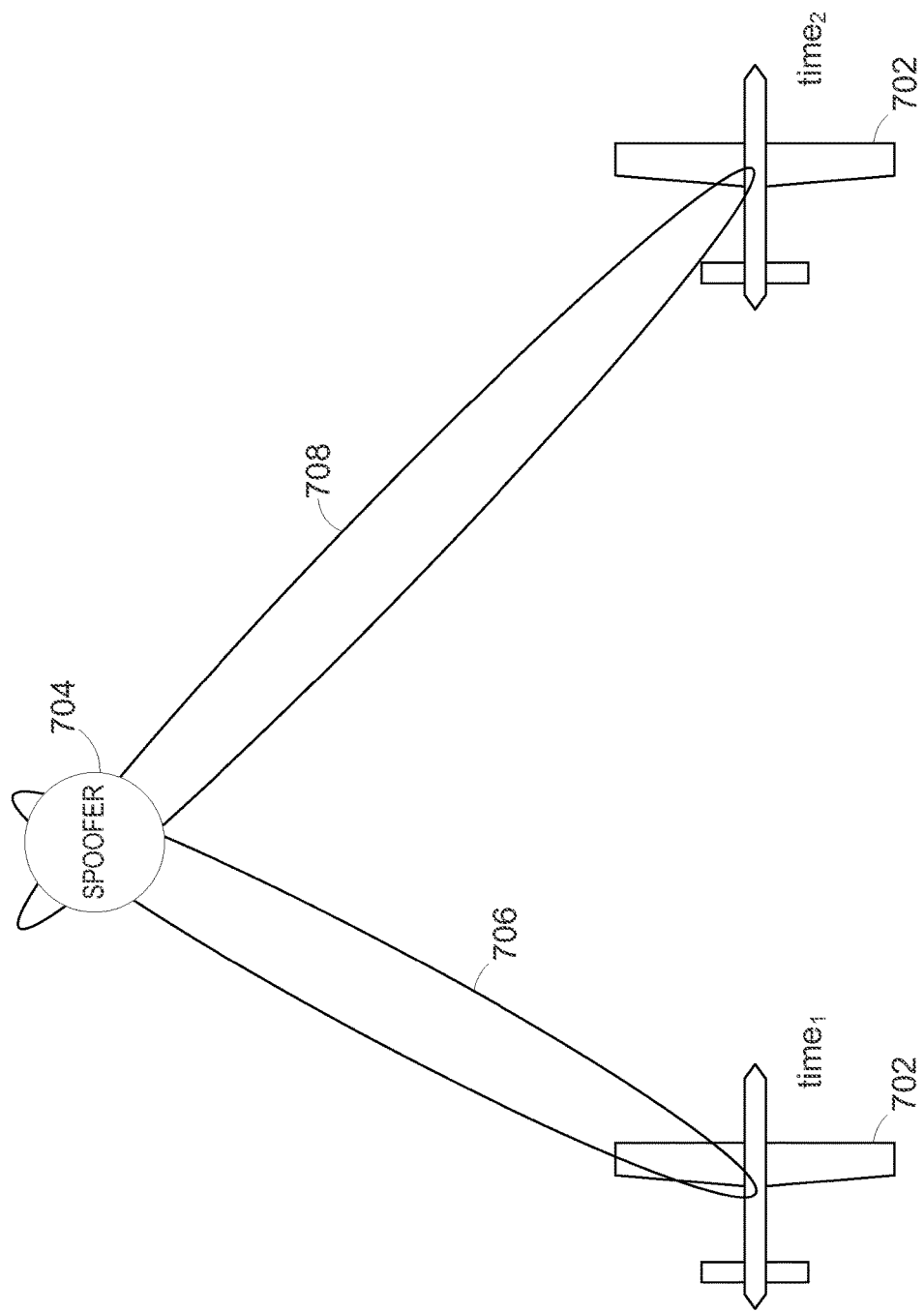
FIG. 7 illustrates a technique to locate a spoofer with respect to a global reference frame.

FIG. 7 illustrates a technique to locate a spoofer with respect to a global reference frame. For convenience, the global reference frame can be the same one that is already used by the GNSS receiver 404, such as WGS 84 for GPS or PZ-90 for GLONASS. For example, a common scenario is to have a GNSS receiver on a moving object, such as an air vehicle, and for a spoofer to be relatively stationary to protect an installation. As illustrated in FIG. 7, an object 702 carrying the CRPA 402 and the GNSS receiver 404 can observe a spoofer 704 along a first direction 706 at a first time $time_1$ and first position. At a second time $time_2$ and second position, the object 702 carrying the CRPA 402 and the GNSS receiver 404 can reobserve the spoofer 704 along a second direction 708. Alternatively, the object 702 can correspond to two or more objects that are observing the spoofer 704 at about the same time. The use of multiple objects for observing the spoofer 704 can be beneficial if the spoofer 704 is mobile. The first position and the second position can be precisely known via the position calculated by the GNSS receiver 404.

The process described earlier in connection with FIG. 6 identifies directions to one or more spoofers. These antenna directions 706, 708 can be determined with respect to a local reference frame, such as a reference frame relative to an orientation of the object 702 using beam angles, or to a global reference frame. Of course, observations can be translated from one reference frame to another. It should be noted that the object 702 can be a dynamically moving object, such as an unmanned aerial vehicle (UAV) so that maneuvering of the object 702 can change the calculations used for converting from a local reference frame to a global reference frame.

While the antenna beam angles 706, 708 to a relatively stationary spoofer 704 should intersect where the spoofer 704 is located, the antenna beam angles 706, 708 can be relatively imprecise, and in general, lines in 3-dimensional space do not intersect. In one embodiment, an approximate location for the intersection of the antenna directions 706, 708 can be found in 3 dimensions. In alternative embodiments, an altitude for the spoofer can be assumed (such as ground level) and an intersection or approximate location for an intersection can be found in 2 dimensions.

The process can obtain the approximate location of the intersection by projecting the first position along the first direction 706, projecting the second position along the second direction 708, and finding the approximate location of the intersection of the at least two projections. The two projections may not precisely intersect, and the point or locus at which the two projections are the closest to each other can be taken as an estimated position of the spoofer 704. For example, an approximate solution can be used, such as finding a best fit using least squares. Conceptually, the process can be visualized as follows. A first line parallel to the first direction is drawn intersecting the first position, and a second line parallel to the second direction is drawn intersecting the second position. The spoofer 704 should exist at the intersection of the first line and the second line, which can be solved using 3 dimensional vector math. The vector math can be similar to the math used in airplane collision avoidance.

Various techniques can be used to determine the location of the spoofer 704. Equation 1 illustrates one calculation that can efficiently yield the location s of the spoofer 704 based on observations spaced out over distance. Equation 1 is general to n dimensions and can be used for 2 dimensions or 3 dimensions.

$$s = \left(\sum_i (I - v_i v_i^T)\right)^{-1} \left(\sum_i ((I - v_i v_i^T) p_i)\right) \qquad \text{Eq. 1}$$

In Equation 1, the location s corresponds to a column vector yielding the location, such as a 3-dimensional Cartesian coordinate (x, y, z) location of the spoofer 704. Other coordinate systems can be used, such as the WGS-84/PZ90 system as used in GPS. The observation index i corresponds to the i-th observation. There should be at least 2 observations to solve for the spoofer location s.

The position $p_i$ corresponds to the position of the object 702 at the i-th observation. The vector $v_i$ corresponds to a unit vector passing through position $p_i$ along the i-th direction to the spoofer 704. In the format of Equation 1, the vector $v_i$ can be a column vector.

For example, at $time_1$, the observation index i can be 1, the object 702 can be at position $p_1$ and have the first direction 706. At $time_2$, the observation index i can be 2, the object 702 can be at position $p_2$ and have the second direction 708. The reference frames used can be global or local, but possible maneuvers of the object 702 should be taken into account when a local reference frame is used. For example, the positions $p_1$ and $p_2$ can be obtained from the GNSS system for the object 702. Alternatively, for example, the position $p_1$ can be treated as being at an origin of a local reference frame, and that positions in that local reference frame can later be translated to a global reference frame.

The vector $v_i^T$ represents the transpose of the vector $v_i$ and can be a row vector. For a 3-dimensional solution, the matrix I can correspond to a 3×3 identity matrix. For a 2-dimensional solution, the matrix I can correspond to a 2×2 identity matrix. After various summations and matrix operations, such as multiplications, subtractions, inversions, etc., the spoofer location s can be determined. Multiple observations can improve the accuracy of the spoofer location s.

While more observations can lead to more accurate computations for the spoofer location s, a spoofer can be mobile. Accordingly, it can be desirable to restrict the summations of Equation 1 to relatively recent observations. For example, there can be multiple iterations of Equation 1, some with relatively large numbers of observations, which may be advantageous for precision and accuracy, and some iterations with relatively small numbers of recent observations to track possible mobile spoofer locations s. Other calculations are possible.

Additional observations of object positions and directions to the spoofer 704 can be used to improve the accuracy and reduce the uncertainty of the estimated position of the spoofer 704. For example, a locus at which multiple projections converge can be taken to be the estimated position of the spoofer 704.

After the position of the spoofer 704 within a global reference frame such as WGS 84 has been determined, the position can be advantageously used. For example, the position of the spoofer 704 can be used to direct the null steering. For example, further null steering can be based on the determined location of the spoofer 704, the position of the object, and an attitude of the object. In another example, the determined location of the spoofer 704 can be transmitted or reported to authorities or to a base station for intervention. In another example, the determined location of the spoofer 704 can be provided to a targeting system for destruction of the spoofer 704.

In alternative embodiments, rather than providing the location of the spoofer 704, the process provides the position of the object and the beam angles to the spoofer 704 for remote calculation of the location of the spoofer 704. Such techniques can merge observations from multiple objects to collaboratively locate the spoofer 704.

Figure 8:
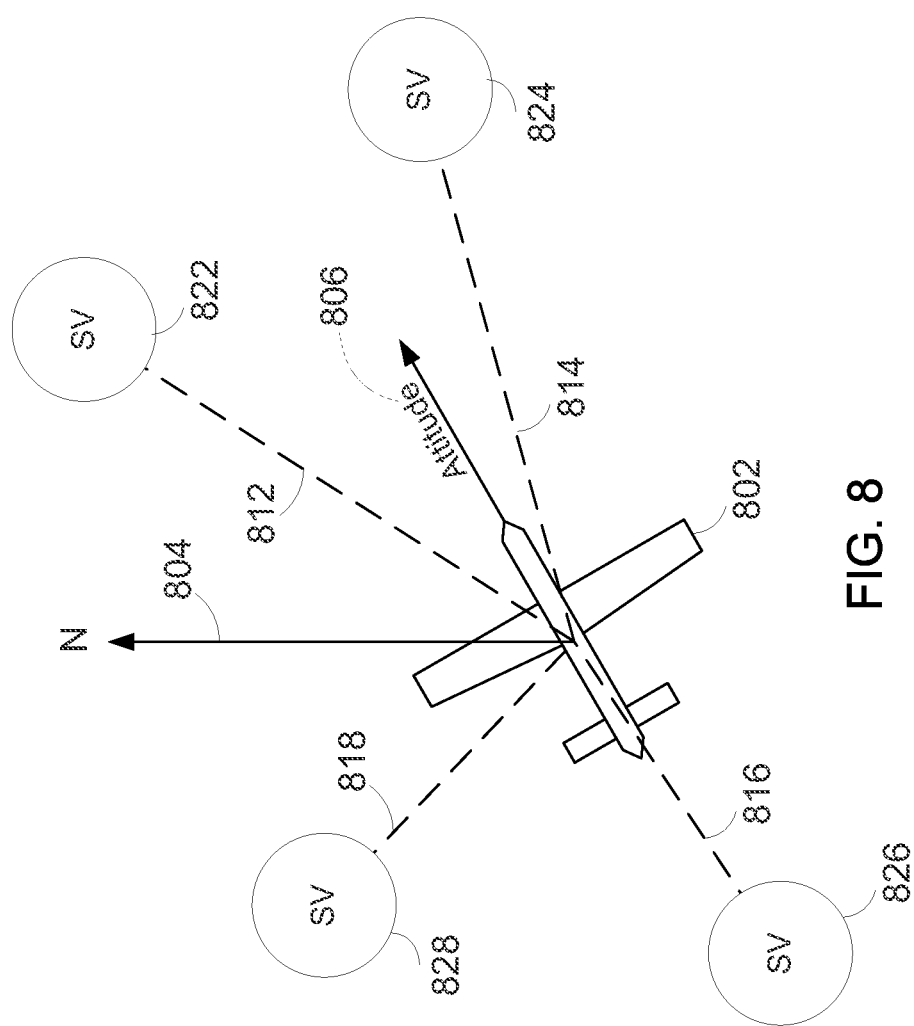
FIG. 8 illustrates an example of an object, a North direction, an attitude, and beam angles to space vehicles.

FIG. 8 illustrates an example of an object 802, a North direction 804, an attitude 806, and observed beam angles 812, 814, 816, 818 to space vehicles (SV) 822, 824, 826, 828. The beam angles can be treated as coordinates and can be expressed in azimuth and elevation. The number of space vehicles 822, 824, 826, 828 will vary based on environmental conditions, interference, and the like. The attitude 806 generally includes roll, pitch, and heading. It can be desirable to know the attitude of an object, such as the attitude of an air vehicle. Knowledge of even just a heading portion of the attitude can be especially important when flying by instruments or remotely. For example, aircraft can include a flight instrument known as a heading indicator. Disclosed is a technique for determining at least a portion of an attitude of the object 802 by merging information obtained from GNSS signals and a controlled reception pattern antenna (CRPA) attached to, carried by, or incorporated with the object 802.

Conventional GNSS techniques can be used to determine the position of the object 802 and the positions of the space vehicles. In the context of GPS, the position of a space vehicle can be determined from ephemeris information decoded from the space vehicle's navigation message.

Figure 9:
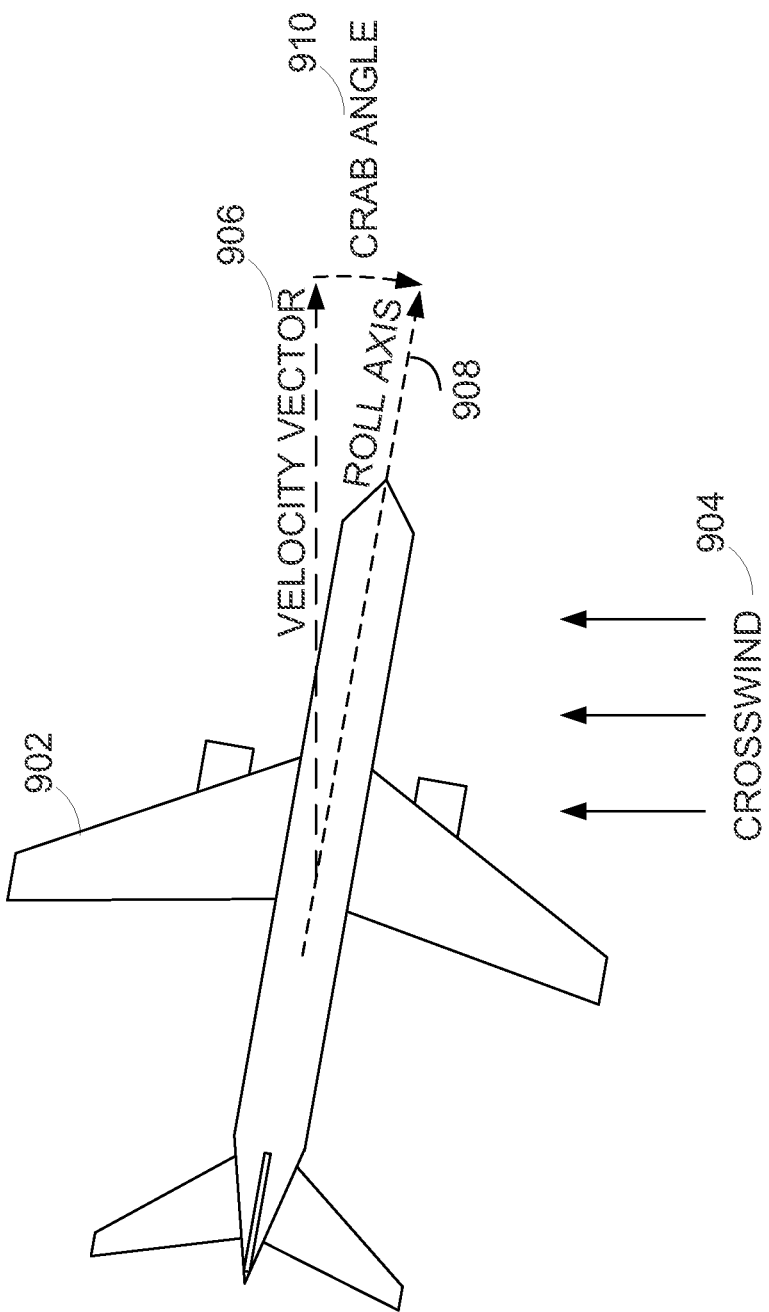
FIG. 9 is a top view of an airplane, showing the effects of a crosswind on the velocity vector and roll axis.

In the context of heading, FIG. 9 illustrates how difficult it can be to observe an object's attitude using GNSS alone. For example, in the context of an airplane, a crosswind can cause the heading of the airplane to vary from the track by an angle known as a drift angle or crab angle. Sliding over slippery or unstable surfaces, crosscurrents, and tides can affect other types of objects. In the presence of a drift angle or crab angle, the actual heading of an object cannot be determined by tracking position over time. An IMU can be used to generate attitude. However, IMUs can drift over time so that having another reference to calibrate the IMU is desirable.

The disclosed techniques can be used to calibrate drift of an IMU. GNSS can be used alone or in combination with other sensors, such as an inertial measurement unit (IMU), dead reckoning sensors, and the like. The combination of sensors can provide better accuracy than the individual sensors alone. For example, the signals from a satellite system can be blocked by buildings or by interference. Also, it can be difficult to track a satellite signal in a high dynamic environment. The tracking of a satellite signal can be aided with an IMU, which can assist in maintaining lock to the satellite signal when interference is encountered, and can also assist in reacquiring the signal after tracking has been lost.

An IMU typically includes 3 accelerometers and 3 gyroscopes, however, fewer or greater numbers of accelerometers and/or gyroscopes can be used. Accelerometers sense acceleration and gyroscopes sense angular velocity. When attached or strapped down to a vehicle, the IMU can be referred to as a strapdown IMU. The accuracy of an IMU can vary in a very wide range and can vary over time. An IMU with relatively good accuracy can be very expensive and/or very large, and a relatively inexpensive IMU can suffer from relatively poor accuracy, which can cause a positioning receiver to have a relatively poor device specification. For example, gyroscopes and accelerometers can have DC offsets or drifts, which then indicate rotation or acceleration when there is none. These DC offsets should be compensated as part of a calibration process.

When a GNSS system is integrated with an IMU, the GNSS data can be used to calibrate the IMU. However, there are situations in which such calibration does not work well or is impractical. FIGS. 3A-3C and 9 illustrate such a situation. It should be noted that FIG. 9 illustrates a heading as a direction while FIGS. 3A-3C illustrate the heading axis, that is, the axis about which the heading pivots.

FIG. 9 illustrates a top-view of an airplane 902 that is flying in a crosswind 904. Due to the crosswind 904, the airplane's motion is characterized by a velocity vector 906 that is displaced from the airplane's roll axis 908 by an angle referred to as a "crab angle" 910. A similar effect can be observed in an automobile when the tires are sliding on the pavement or in a boat in a crosscurrent. If the airplane 902 is operating at a relatively steady speed, such as gliding, then the accelerometers of the IMU will detect relatively little acceleration, and the velocity vector 906 will incorrectly appear to be the roll axis 908. For the IMU, the roll axis 908 is part of the "true" attitude. However, the velocity vector 906 will appear to the GPS to be the "estimated" attitude for the roll axis 908. Pivoting by the airplane about a heading axis (FIG. 3C), causes the roll axis 908 to swing.

As explained earlier in connection with FIG. 3C, with conventional techniques, the drift of the gyroscope(s) configured to determine rotation about the heading axis will typically not be able to be calibrated. While acceleration or deceleration will reveal acceleration along the true roll axis and thus permit calibration of the heading axis gyroscope(s), acceleration or deceleration can waste fuel and requires some form of energy, such as from engines or rockets. Thus, relying on acceleration or deceleration is not a practical solution for a glider or for use in a vehicle that, for example, has exhausted its rocket fuel. For example, when the space shuttle lands, it lands as a glider.

In an example of a military application, a vehicle, ordinance, or other object can be guided to a target using positioning information obtained from a GNSS and IMU. The target may be protected by jamming equipment and/or spoofers, which can render reception to the GNSS signals difficult near the target. The IMU can then be used to continue to guide the vehicle to the target. Accordingly, the IMU may have relatively strict performance requirements, which can be expensive to achieve. Calibration of drift can greatly enhance the accuracy of an IMU, thereby permitting a relatively inexpensive IMU to be used in an application that typically demands a relatively expensive and highly precise IMU. For example, such calibration techniques can greatly improve the accuracy of the IMU beyond the specifications of the IMU.

An inertial measurement unit (IMU) typically includes 3 accelerometers for sensing acceleration in three orthogonal axis, and 3 gyroscopes for sensing angular motion in the three axes. These 3 axes are typically the same for the accelerometers and for the gyroscopes, but can be different. Regardless of the particular orientation for the accelerometers or the gyroscopes, a processor utilizing strapdown equations can make the necessary reference frame conversions for conversion of raw IMU data ($\Delta\theta$, $\Delta v$) to the roll axis, the pitch axis, and the heading axis. Other reference frames can also be used.

Figure 10:
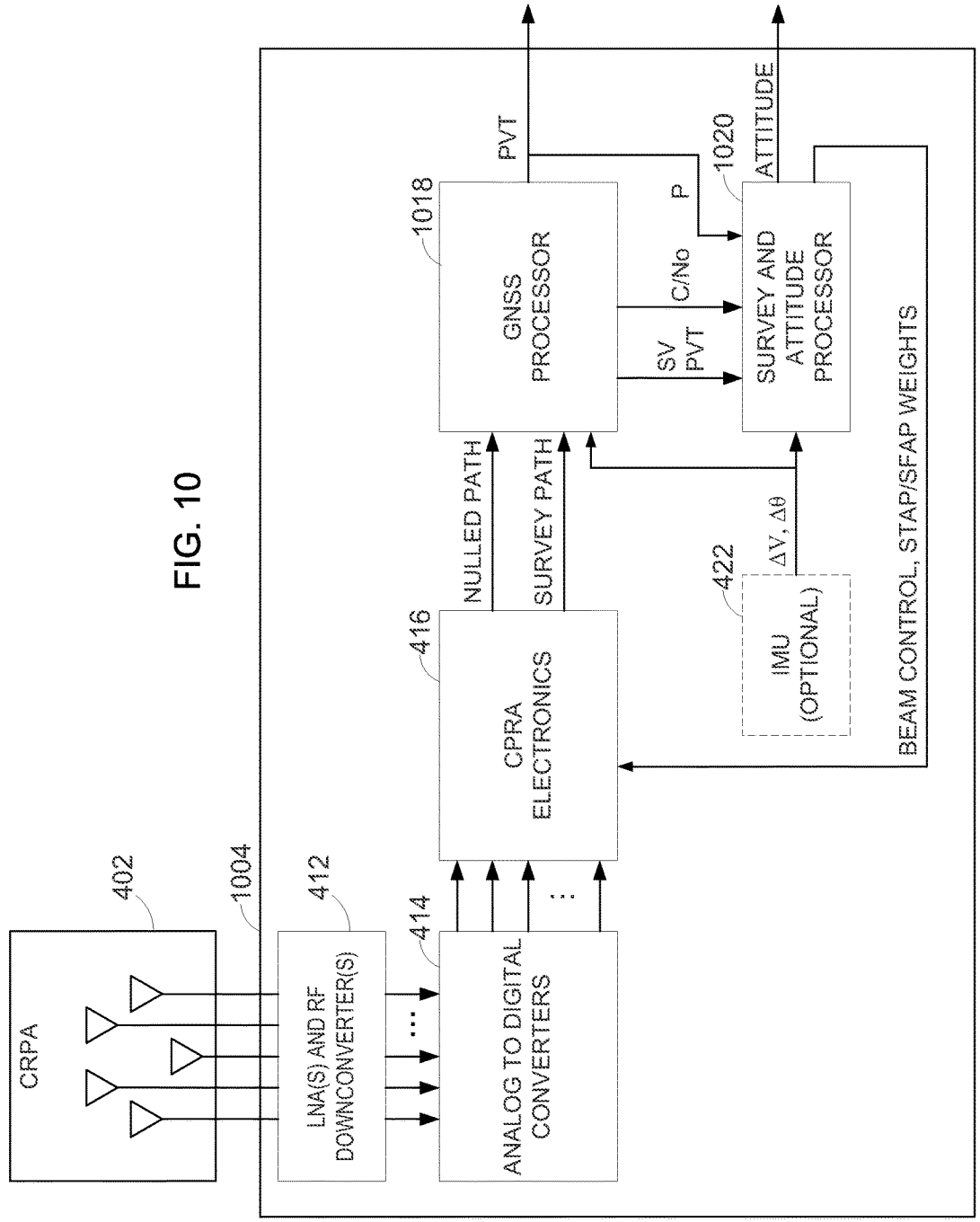
FIG. 10 illustrates another embodiment of a CRPA and a global positioning system (GPS) receiver.

FIG. 10 illustrates an example of the CRPA 402 and a GNSS receiver 1004. To avoid repetition of description, components having the same or similar function between FIGS. 4 and 10 may be referenced by the same reference number. The GNSS receiver 1004 can be a global positioning system (GPS) receiver and can be similar to the GNSS receiver 404 described earlier in connection with FIG. 4. In the illustrated embodiment, the GNSS receiver 1004 performs the same anti-spoofing nulling as the GNSS receiver 404 and further includes the feature of the determination of attitude. However, in alternative embodiments, the attitude determination can be provided standalone.

The determination of attitude can be performed using the same surveying data collected during the survey for the detection of spoofers. In alternative embodiments, surveying of space for the determination of heading can be performed by a separate survey.

The illustrated GNSS receiver 1004 includes low noise amplifiers (LNAs) and radio frequency (RF) downconverters 412, analog to digital converters (ADCs) 414, CRPA electronics 416, a GNSS processor 1018, a survey and attitude processor 1020, and an optional inertial measurement unit (IMU) 422. Portions of the GNSS processor 1018 and the survey and attitude processor 1020 can be efficiently implemented in software/firmware, and can even be implemented using the same or different processors for execution of instructions. The low noise amplifiers (LNAs) and radio frequency (RF) downconverters 412, the analog to digital converters (ADCs) 414, the CRPA electronics 416, and the optional inertial measurement unit (IMU) 422 can be as described earlier in connection with FIG. 4. Various components of the GNSS receiver 1004 can be implemented by hardware, by software/firmware executed by a processor, or by a combination of both hardware and software/firmware.

Signals from the separate antenna patterns of the nulled path and the survey path(s) are provided as inputs to the GNSS processor 1018. The nulled path corresponds to an antenna pattern with one or more spoofers nulled when one or more spoofers have been detected. For embodiments in which no spoofer nulling is performed, the nulled path can be an antenna pattern for normal use, such as, but not limited to, an omnidirectional antenna pattern. The survey path can correspond to a relatively narrow beam or main lobe for searching for the relative location of a space vehicle with reference to the beam angles for the CRPA 402. In one embodiment, the same beam used for searching for spoofers is used to identify the directions to the space vehicles. In alternative embodiments, a different beam can be used, or multiple different beams can be used as digital beamforming permits the generation of multiple beams with relative ease. The rest of the description of FIG. 10 will follow without further description of processing to locate or null out spoofers.

The GNSS processor 1018 acquires and tracks the signals from the various space vehicles. The GNSS processor 1018 generates a position, velocity, and time (PVT) output relating to the object's position, velocity, and time as observed using signals received via the nulled path. The GNSS processor 1018 can also determine PVT for the space vehicle and an indication of signal power, such as carrier power to noise density ratio (C/No) from the signals received via the survey path for the survey processor 420. The GNSS processor 418 described earlier in connection with FIG. 5 can be used for the GNSS processor 1018. Advantageously, the GNSS processor 418 of FIG. 5 is implemented in parallel and can search multiple SVs for each beam angle. Where the indication of signal power, such as carrier power to noise ratio (C/No) is a relative maximum for a given space vehicle (as identified, for example, by the space vehicle's spreading code or frequency), the beam angle can be considered to be pointing to the space vehicle. The search can also be performed sequentially with fewer channels, such as one channel, if desired.

The survey and attitude processor 1020 receives a position of the object 802, the PVT of the space vehicles, indications of signal power for the various space vehicles from the GNSS processor 1018, such as carrier power to noise ratio (C/No), and can optionally receive acceleration ΔV and angular velocity Δθ information from the optional IMU 422. The survey and attitude processor 1020 controls the beamformers of the CRPA electronics 416. The survey and attitude processor 1020 can be implemented by a processor executing program instructions for software/firmware stored in a non-transitory computer-readable medium. Alternatively, hardware, such as an application specific integrated circuit or a field programmable gate array, can be used to implement the survey and attitude processor 1020. The operation of one embodiment of the survey and attitude processor 1020 will now be described with reference to FIGS. 11 and 12.

Figure 11:
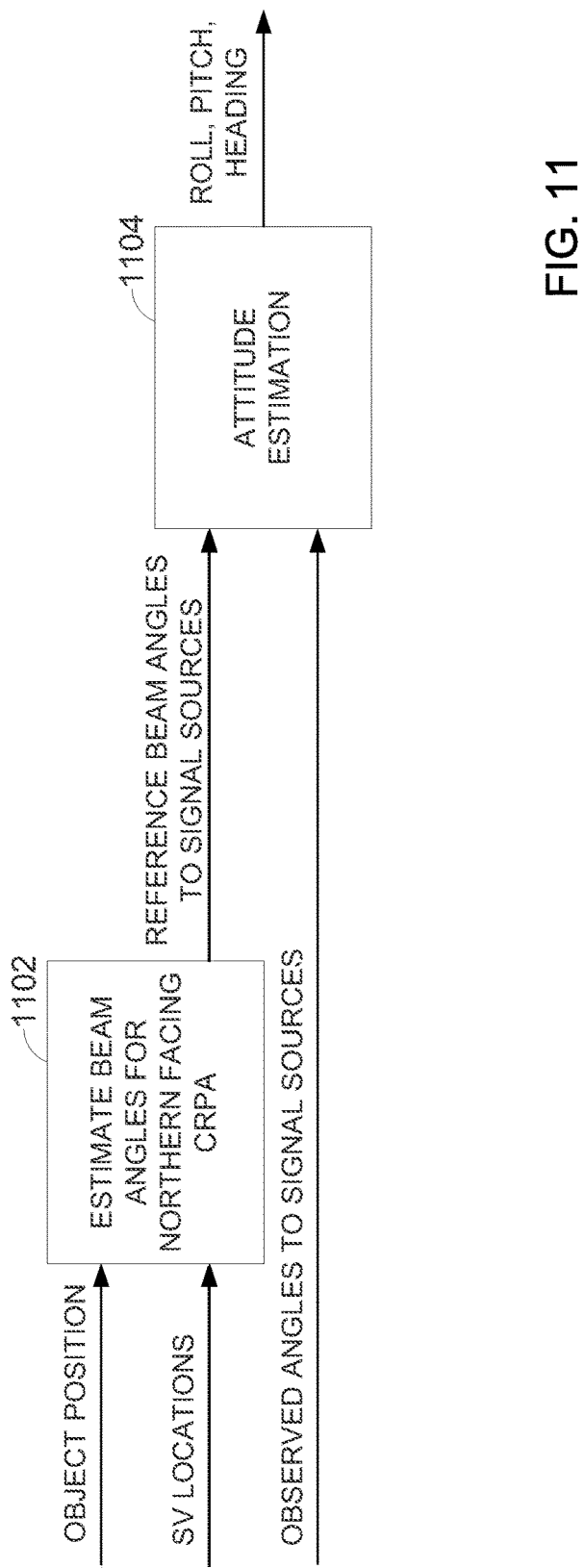
FIG. 11 illustrates a data flow to estimate the attitude of an object.

FIG. 11 illustrates an example of a data flow to estimate the attitude of the object 802. The data flow includes a block 1102 and a block 1104. The blocks can be implemented by hardware and/or software/firmware.

In the block 1102, beam angles are estimated based on the position (P) of the object 802 and on the positions of the space vehicles. The position (P) of the object 802 can be provided as an output of the GNSS processor 1018 (FIG. 10). The estimation of angles can be based on a calculation of line of sight (LOS) vectors, which is commonly performed in typical GNSS receivers. The position of the object 802 and the space vehicle positions can also be determined based on conventional GNSS techniques. However, these conventional techniques of generating LOS vectors do not reveal the attitude of the object 802.

The number of space vehicles 822, 824, 826, 828 that are observable at a given time will depend on a variety of factors including environmental conditions and interference. In addition, to determine the attitude of the object 802, fewer than all of the observable space vehicles 822, 824, 826, 828 can be used, though accuracy will typically be better with larger numbers of space vehicles 822, 824, 826, 828. In one embodiment, at least one of the space vehicles 822, 824, 826, 828 is used.

In the illustrated embodiment, the estimates of the beam angles, such as azimuth and elevation, are generated with reference to some global reference frame, which can be WGS 84. Based on these beam angles and an assumed reference orientation, such as a hypothetical orientation corresponding to North (zero azimuth) with zero roll and zero pitch for the object 802 or the CRPA of the object 802, the process can generate hypothetical reference beam angles to the space vehicles based on the assumed reference orientation.

The reference beam angles are passed from the block 1102 to the block 1104. The block 1104 receives the reference beam angles and receives the observed beam angles 812, 814, 816, 818 to the space vehicles 822, 824, 826, 828 as inputs. The observed beam angles 812, 814, 816, 818 should correspond to the authentic space vehicles 822, 824, 826, 828 and not to beam angles to a spoofer. In the block 1104, the process can rotate the hypothetical orientation with respect to azimuth, roll, and pitch until the reference beam angles and the observed beam angles 812, 814, 816, 818 match. The amount of rotation reveals the attitude of the object 802. Alternatively, an arbitrary orientation corresponding to the attitude can be rotated until the observed beam angles 812, 814, 816, 818 match with the reference beam angles, which yields the same result with the same attitude. The rotations for searching for the matching rotation for the match between the reference beam angles and the observed beam angles can be performed in a variety of ways, such as, but not limited to, brute force, successive approximation, or the like. For example, the determination of matching orientations can be made based on a best fit technique utilizing a minimization of least squares, but other techniques can be used.

Figure 12:
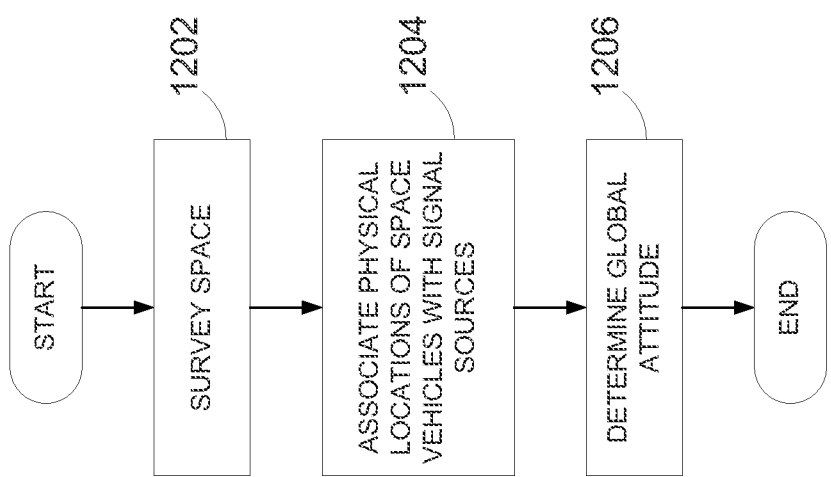
FIG. 12 illustrates an example of a process to determine a global attitude.

FIG. 12 illustrates an example of a process to determine a global attitude. The attitude includes heading, roll, and pitch, and the process can be used to generate less than all of the attributes of an attitude if desired. It will be appreciated by the skilled practitioner that the illustrated process can be modified in a variety of ways. For example, in another embodiment, various portions of the illustrated process can be combined, can be rearranged in an alternate sequence, can be removed, or the like. At the start of the process, it is assumed that the GNSS receiver 1004 (FIG. 10) has acquired and tracked signals from space vehicles such that the position of the object 802 (FIG. 8) carrying the GNSS receiver 1004 is known and the positions of the space vehicles 822, 824, 826, 828 are known.

The process starts at a state 1202 in which the process surveys at least a portion of space to observe instances of radio frequency (RF) signal strength relative to a line of sight of a main lobe of the CRPA 402 (FIG. 10). The survey can be performed sequentially or in parallel. For example, multiple beams can be generated by the beamformers of the CRPA electronics 416 and signals from multiple SVs can be searched in parallel. The main lobe(s) is generated as by one or more patterns of the beamformers of the CRPA electronics 416. The process advances from the state 1202 to a state 1204.

In the state 1204, the process associates instances of observed signal strength of signals at various directions with physical locations of the space vehicles. If a spoofer is present and detected, the directions to the spoofer can be filtered out from the instances of observed signal strength at various angles. For example, the survey and attitude processor 1020 (FIG. 10) can direct the main lobe of the survey path to a plurality of antenna directions (azimuth and elevation angles). For speed, multiple antenna patterns can be used in parallel. The GNSS processor 1018 can provide an indication of signal power, such as carrier-to-noise ratio (C/No) versus antenna direction. For example, the indication of signal power can be used to populate a first table in memory, which can be repeatedly updated. The first table can include signal power values referenced by antenna directions for the main lobe of the survey path. The antenna directions can be referenced to a global reference frame to account for possible maneuvering of an object carrying the CRPA 402.

As described earlier, a spoofer or spoofers can be detected, for example, by observing beam angles at which relatively many satellite signals increase in power. By observing these power increases, entries considered to be corresponding to the spoofer in the first table can be identified. A second table in memory can be used to store a filtered version of the first table, with the entries corresponding to the spoofer removed. For example, entries of the first table corresponding to a spoofer can be modified when copied to the second table, such as by making the signal power effectively zero for the antenna direction along the spoofer. To provide a safety margin, additional antenna directions near the spoofer can also be zeroed out. The amount of safety margin to use will depend on the width of main lobe of the survey patterns, which can vary based on the number of antenna elements and the antenna configuration. The remaining entries in the second table can then indicate the antenna directions to the authentic signal sources, which are further identifiable to specific space vehicles. In the context of GPS, unique spreading codes identify which space vehicle has transmitted a particular signal. In GLONASS, a frequency can be used to identify which space vehicle has transmitted a particular signal. The process advances from the state 1204 to a state 1206.

In the state 1206, the process determines at least the global heading of the object 802 based at least partly on the orientation of the object 802 with respect to the physical locations of the space vehicles. Other attributes, such as roll and pitch can also be determined such that the process can determine the attitude of the object 802.

For example, the process can convert the position of the object 802 and the positions of the space vehicles into beam angles that the CRPA 402 of the object 802 should encounter with a reference orientation, such as facing true North with zero roll and zero pitch. The process can then rotate the reference orientation with respect to azimuth, roll, and pitch and correspondingly rotate the reference beam angles until there is a relatively close match between the rotated beam angles and the observed beam angles 812, 814, 816, 818. In alternative embodiments, the observed beam angles 812, 814, 816, 818 can be rotated until there is a relatively close match between the rotated observed beam angles and the reference beam angles. Either way, the resulting shifts in azimuth, roll, and pitch reveal the object's attitude.

The disclosed techniques are not applicable to mental steps, and are not performed within the human mind or by a human writing on a piece of paper.

The foregoing description and following claims may refer to elements or features as being "coupled" together. As used herein, unless expressly stated to the contrary, "coupled" means that one element/feature is directly or indirectly coupled to another element/feature, and not necessarily mechanically. Thus, although the drawings illustrate various examples of arrangements of elements and components, additional intervening elements, devices, features, or components may be present in an actual embodiment.

Devices employing the above described schemes can be implemented into various electronic devices. Examples of the electronic devices can include, but are not limited to, consumer electronic products, parts of the consumer electronic products, electronic test equipment, defense electronic products, avionics, etc. The electronic products can include, but are not limited to, an automobile, a camcorder, a camera, a digital camera, a portable memory chip, a communication system, a smart phone, a mobile phone, a GNSS navigation system, an altitude and heading reference system (AHRS), a heading indicator, a guidance system, including projectile and/or missile guidance, a tracking or data logging system, a surveying system, a mapping system, a gunshot detection system, etc.

Various embodiments have been described above. Although described with reference to these specific embodiments, the descriptions are intended to be illustrative and are not intended to be limiting. Various modifications and applications may occur to those skilled in the art.

What is claimed is:

1. An apparatus comprising:
   a beamformer configured to generate a plurality of antenna patterns to beam steer a main lobe of an antenna pattern of a controlled reception pattern antenna (CRPA);
   a processor of a global navigation satellite system (GNSS) receiver configured:
   to cause the beamformer to generate and steer the main lobe of the CRPA to survey a plurality of directions in space;
   determine that a spoofer exists along a particular beam angle in the surveyed space when signals appearing to be associated with two or more space vehicles of a global navigation satellite system are higher in signal power along the particular beam angle relative to other directions; and
   to cause the beamformer to generate and steer a null along the particular beam angle to null out signals emanating from the spoofer such that interfering signals from the spoofer are suppressed.

2. The apparatus of claim 1, wherein the signal power comprises a carrier power to noise ratio.

3. The apparatus of claim 1, wherein the processor is configured to actively steer the null such that the null remains pointed towards the spoofer despite changes in attitude induced by vehicle dynamics of a vehicle to which the CRPA is attached and/or changes in location of the spoofer.

4. The apparatus of claim 1, wherein the processor is further configured to:
   reference beam steering and null steering activities to a global reference frame; and
   cause the beamformer to steer the null such that the null remains pointed towards the spoofer despite changes in attitude of the CRPA induced by vehicle dynamics of a vehicle to which the CRPA is attached.

5. The apparatus of claim 4, wherein the processor is further configured to:
   receive vehicle dynamics information of a vehicle from an inertial measurement unit (IMU), wherein CRPA and the IMU are attached to the vehicle; and
   cause the beamformer to steer the null based at least partly on the vehicle dynamics information.

6. The apparatus of claim 1, wherein the processor is further configured to estimate a heading of an object based at least partly on beam steering main lobe angles to GNSS space vehicle positions and an orientation of the object with respect to the GNSS space vehicle positions, wherein the CRPA is attached, directly or indirectly, to the object.

7. The apparatus of claim 1, wherein the processor is further configured to repeatedly survey a plurality of beam angles and determine new beam angles to the spoofer and/or to observe new spoofers.

8. The apparatus of claim 1, wherein the processor is further configured to:
   determine a position of an object with the GNSS signals, wherein the CRPA is attached, directly or indirectly, to the object;
   observe the spoofer at least twice; and
   determine the location of the spoofer based on observed positions of the object and observed beam angles to the spoofer.

9. The apparatus of claim 8, wherein the processor is further configured to determine the location of the spoofer by computation of the following:

$$s = \left(\sum_i (I - v_i v_i^T)\right)^{-1} \left(\sum_i ((I - v_i v_i^T) p_i)\right),$$

wherein s corresponds to the location of the spoofer, i corresponds to an observation index, I corresponds to an identity matrix, $v_i$ corresponds to a unit vector having in an i-th observed direction to the spoofer, $v_i^T$ corresponds to a transpose of the vector $v_i$, and $p_i$ corresponds to a position of the object at observation i.

10. The apparatus of claim 8, wherein the processor is further configured to at least temporarily cause the beamformer to generate and steer the null based at least partly on the determined location of the spoofer, the position of the object, and an attitude of the object.

11. The apparatus of claim 8, wherein the processor is further configured to cause the determined location of the spoofer to be transmitted to a base station.

12. The apparatus of claim 8, wherein the processor is further configured to cause the determined location of the spoofer to be provided a targeting system.

13. The apparatus of claim 1, wherein the processor is configured to determine that the spoofer exists along the particular beam angle when the signal power increases beyond a predetermined threshold amount or by a predetermined threshold ratio for signals appearing to be associated with the two or more GNSS satellites.

14. The apparatus of claim 1, wherein the processor is configured to determine that the spoofer exists along the particular beam angle when the signal power increases beyond a predetermined threshold amount or by a predetermined threshold ratio for the majority the signals appearing to be associated with the two or more GNSS satellites.

15. An electronically-implemented method of invoking a countermeasure for a global navigation satellite system (GNSS) receiver, the method comprising:
    beam steering, by a beamformer of the GNSS receiver, a main lobe of a survey antenna pattern of a controlled reception pattern antenna (CRPA) connected to the GNSS receiver to survey a plurality of directions in space;
    determining, by a processor of the GNSS receiver, that a spoofer exists along a particular beam angle in the surveyed space when signals appearing to be associated with two or more space vehicles of a global navigation satellite system are higher in signal power along the particular beam angle relative to other directions; and
    steering, by a beamformer of the GNSS receiver, a null of an antenna pattern along the particular beam angle to null out signals emanating from the spoofer such that interfering signals from the spoofer are suppressed.

16. The method of claim 15, wherein the signal power comprises a carrier power to noise ratio.

17. The method of claim 15, further comprising actively steering such that the null remains pointed towards the spoofer despite changes in attitude induced by vehicle dynamics of a vehicle to which the CRPA is attached and/or changes in location of the spoofer.

18. The method of claim 15, further comprising:
    referencing the beam steering and null steering to a global reference frame; and
    steering such that the null remains pointed towards the spoofer despite changes in attitude induced by vehicle dynamics of a vehicle to which the CRPA is attached.

19. The method of claim 18, further comprising:
    receiving vehicle dynamics information of a vehicle from an inertial measurement unit (IMU), wherein the CRPA and the IMU are attached to the vehicle; and
    steering the null based at least partly on the vehicle dynamics information.

20. The method of claim 15, further comprising estimating a heading based at least partly on beam steering main lobe angles and the position of the GNSS receiver.

21. The method of claim 15, further comprising repeatedly performing beam steering and determining to obtain new beam angles to the spoofer and/or to observe new spoofers.

22. The method of claim 15, further comprising:
    determining a position of an object with the GNSS signals, wherein the CRPA is attached, directly or indirectly, to the object;
    observing the spoofer at least twice; and
    determining the location of the spoofer based on observed positions of a object and observed beam angles to the spoofer.

23. The method of claim 22, wherein determining the location of the spoofer further comprises computing the following:

$$s = \left(\sum_i (I - v_i v_i^T)\right)^{-1} \left(\sum_i ((I - v_i v_i^T) p_i)\right),$$

wherein s corresponds to the location of the spoofer, i corresponds to an observation index, I corresponds to an identity matrix, $v_i$ corresponds to a unit vector having in an i-th observed direction to the spoofer, $v_i^T$ corresponds to a transpose of the vector $v_i$, and $p_i$ corresponds to a position of the object at observation i.

24. The method of claim 22, further comprising at least temporarily performing further null steering based at least partly on the determined location of the spoofer, the position of the object, and an attitude of the object.

25. The method of claim 22, further comprising transmitting the determined location to a base station.

26. The method of claim 22, further comprising providing the location of the spoofer to a targeting system.

27. An apparatus comprising:
    a beamformer configured to beam steer a main lobe of a first antenna pattern of a controlled reception pattern antenna (CRPA) for surveying and to steer a null of a second antenna pattern of the CRPA as a countermeasure; and
    a means for determining that a spoofer exists along a particular beam angle when signals appearing to be associated with two or more space vehicles of a global navigation satellite system (GNSS) increase in signal power along the particular beam angle relative to other directions, wherein the determining means is part of a GNSS receiver, wherein the determining means is further configured to cause the beamformer to direct the null along the particular beam angle such that interfering signals from the spoofer are suppressed.

* * * * *

UNITED STATES PATENT AND TRADEMARK OFFICE
CERTIFICATE OF CORRECTION

PATENT NO. : 10,024,973 B1
APPLICATION NO. : 14/678755
DATED : July 17, 2018
INVENTOR(S) : Steven B. Alexander Page 1 of 1

It is certified that error appears in the above-identified patent and that said Letters Patent is hereby corrected as shown below:

In the Specification

On Column 7, Line 21: Change "tradeoff" to --tradeoff.--.

In the Claims

On Column 21, Line 37 (Approx.): In Claim 14, after "majority" insert --of--.

Signed and Sealed this
Twenty-third Day of October, 2018

Andrei Iancu
*Director of the United States Patent and Trademark Office*